(12) United States Patent
Foster et al.

(10) Patent No.: US 12,360,526 B2
(45) Date of Patent: Jul. 15, 2025

(54) SYSTEMS AND METHODS FOR OPERATING AN AUTONOMOUS VEHICLE

(71) Applicant: TUSIMPLE, INC., San Diego, CA (US)

(72) Inventors: Scott Douglas Foster, San Diego, CA (US); Erik Orlando Portillo, Sterling, CA (US); Zhujia Shi, San Diego, CA (US); Joyce Tam, Pleasanton, CA (US)

(73) Assignee: TUSIMPLE, INC., San Diego, CA (US)

( * ) Notice: Subject to any disclaimer, the term of this patent is extended or adjusted under 35 U.S.C. 154(b) by 186 days.

(21) Appl. No.: 17/663,410

(22) Filed: May 13, 2022

(65) Prior Publication Data

US 2022/0365530 A1 Nov. 17, 2022

Related U.S. Application Data

(60) Provisional application No. 63/188,913, filed on May 14, 2021, provisional application No. 63/188,917, filed on May 14, 2021.

(51) Int. Cl.
*B60W 60/00* (2020.01)
*G05D 1/00* (2006.01)
(Continued)

(52) U.S. Cl.
CPC ....... *G05D 1/0038* (2013.01); *B60W 60/0015* (2020.02); *G05D 1/0022* (2013.01);
(Continued)

(58) Field of Classification Search
None
See application file for complete search history.

(56) References Cited

U.S. PATENT DOCUMENTS 9,523,984 B1 12/2016 Herbach et al.
11,703,852 B2 * 7/2023 Otaki ................... G05D 1/0038
701/2

(Continued)

OTHER PUBLICATIONS

International Search Report from related International Application No. PCT/US2022/072328 dated Dec. 19, 2022 (18 pages).
(Continued)

*Primary Examiner* — James M McPherson
(74) *Attorney, Agent, or Firm* — Perkins Coie LLP

(57) ABSTRACT

An autonomous vehicle (AV) includes features that allows the AV to comply with applicable regulations and statues for performing safe driving operation. An example method for operating an AV includes receiving, by a computer located in the AV, sensor data that indicates a condition of one or more devices in the AV or of a roadway on which the autonomous vehicle is operating; and causing, by the computer and based on the sensor data, the autonomous vehicle to operate in accordance with a maneuver by sending instructions to one or more devices in the autonomous vehicle, wherein the maneuver is configured to bring the autonomous vehicle to a complete stop. In some embodiments, the maneuver may be selected from a plurality of maneuvers in response to determining an occurrence of a fault condition based on the sensor data.

16 Claims, 6 Drawing Sheets

(51) Int. Cl.
*H04N 7/18* (2006.01)
*H04W 4/44* (2018.01)

(52) U.S. Cl.
CPC ....... *H04N 7/183* (2013.01); *B60W 2420/403* (2013.01); *B60W 2556/45* (2020.02); *B60W 2720/106* (2013.01); *H04W 4/44* (2018.02)

(56) References Cited

U.S. PATENT DOCUMENTS

| | | | |
|---|---|---|---|
| 2018/0321677 A1 | 11/2018 | Letwin et al. | |
| 2018/0348771 A1 | 12/2018 | Chu et al. | |
| 2019/0049948 A1* | 2/2019 | Patel | G05D 1/00 |
| 2019/0171202 A1 | 6/2019 | Fairfield et al. | |
| 2019/0361436 A1* | 11/2019 | Ueda | G05D 1/0022 |
| 2020/0084419 A1* | 3/2020 | Shimotsuma | G08G 1/096811 |
| 2020/0189527 A1* | 6/2020 | Kusama | B60Q 1/1423 |
| 2020/0273335 A1* | 8/2020 | Murakami | G05D 1/0027 |
| 2021/0018323 A1* | 1/2021 | Freedman | B60W 40/06 |
| 2021/0086767 A1 | 3/2021 | Matsunaga | |
| 2021/0276588 A1* | 9/2021 | Kabzan | B60W 10/04 |
| 2022/0147042 A1* | 5/2022 | Trank | H04L 65/80 |
| 2022/0242442 A1* | 8/2022 | McNeely | B60W 50/14 |
| 2022/0397402 A1* | 12/2022 | Bolless | G08G 1/096725 |
| 2022/0413494 A1* | 12/2022 | Kim | G05D 1/0246 |
| 2023/0138112 A1* | 5/2023 | Gross | G08G 1/04 701/24 |
| 2023/0260334 A1* | 8/2023 | Di Francesco | G06V 20/56 701/1 |
| 2023/0368698 A1* | 11/2023 | James | B60W 50/14 |
| 2023/0382371 A1* | 11/2023 | Park | B60W 30/0956 |
| 2024/0051573 A1* | 2/2024 | Clawson | B60W 30/0956 |

OTHER PUBLICATIONS

Svensson, et al. "Safe Stop Trajectory Planning for Highly Automated Vehicles: An Optimal Control Problem Formulation" 2018 IEEE Intelligent Vehicles Symposium (IV), pp. 517-522.

No Author. Surface Vehicle Recommended Practice. J3016, Apr. 2021, pp. 1-41.

Bonyar, Attalia et al. "A Review on Current eCall Systems for Autonomous Car Accident Detection", 2017 40th International Spring Seminar on Electronics Technology (ISSE), IEEE, May 10, 2017, pp. 1-8.

Holzmann, Wolf. European Application No. 22151480.5, Extended European Search Report Mailed Jun. 9, 2022, pp. 1-8.

* cited by examiner

SYSTEMS AND METHODS FOR OPERATING AN AUTONOMOUS VEHICLE

PRIORITY CLAIMS AND RELATED PATENT APPLICATIONS

This patent document claims the priority to and the benefits of U.S. Provisional Application No. 63/188,913 entitled "System and Method For An Autonomous Vehicle" filed on May 14, 2021, and U.S. Provisional Application No. 63/188,917 entitled "System and Method For An Autonomous Vehicle" filed on May 14, 2021. The entire disclosures of the aforementioned applications are hereby incorporated by reference as part of the disclosure of this application.

TECHNICAL FIELD

The present disclosure relates generally to autonomous vehicles. More particularly, the present disclosure is related to operating an autonomous vehicle (AV) appropriately on public roads, highways, and locations with other vehicles or pedestrians.

BACKGROUND

Autonomous vehicle technologies can provide vehicles that can safely navigate towards a destination with limited or no driver assistance. The safe navigation of an autonomous vehicle (AV) from one point to another may include the ability to signal other vehicles, navigating around other vehicles in shoulders or emergency lanes, changing lanes, biasing appropriately in a lane, and navigate all portions or types of highway lanes. Autonomous vehicle technologies may enable an AV to operate without requiring extensive learning or training by surrounding drivers, by ensuring that the AV can operate safely, in a way that is evident, logical, or familiar to surrounding drivers and pedestrians.

SUMMARY

Systems and methods are described herein that can allow an autonomous vehicle (AV) to navigate from a first point to a second point. In some embodiments, the AV can navigate from the first point to the second point without a human driver present in the AV and to comply with instructions for safe and lawful operation.

A first example method of operating an autonomous vehicle comprises: receiving, by a computer located in the autonomous vehicle, sensor data that indicates a condition of one or more devices in the autonomous vehicle or of a roadway on which the autonomous vehicle is operating; and causing, by the computer, and based on the sensor data, the autonomous vehicle to operate in accordance with a maneuver by sending instructions to one or more devices in the autonomous vehicle, wherein the maneuver is configured to bring the autonomous vehicle to a complete stop.

A second example method of operating an autonomous vehicle comprises: receiving, by a computer located in the autonomous vehicle, from a remote computer located in a location outside of the autonomous vehicle, a message indicating a risk to the autonomous vehicle, wherein the message is received via a first communication channel; transmitting, in response to receiving the message or in response to the risk indicated by the message, to the remote computer an image or a video obtained by at least one camera on the autonomous vehicle, wherein the images or the video is transmitted to the remote computer via a second communication channel that is different from the first communication channel; and transmitting, in response to receiving the message or in response to the risk indicated by the message and via the first communication channel, to the remote computer, a second message that includes information related to a maneuver for the autonomous vehicle to reach a complete stop.

In yet another exemplary aspect, a system for operating an autonomous vehicle, comprising a computer that includes a processor configured to perform the above-described methods and the methods described in this patent document are disclosed.

In yet another exemplary aspect, the above-described methods and the methods described in this patent document are embodied in a non-transitory computer readable storage medium. The non-transitory computer readable storage medium includes code that when executed by a processor, causes the processor to perform the methods described in this patent document.

In another exemplary embodiment, a device that is configured or operable to perform the above-described methods is disclosed. In yet another exemplary embodiment, a system comprises a computer located in a vehicle, the computer comprises a processor configured to implement the above-described methods is disclosed.

The above and other aspects and their implementations are described in greater detail in the drawings, the descriptions, and the claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Vehicles traversing highways and roadways are legally required to comply with regulations and statues in the course of safe operation of the vehicle. For autonomous vehicles (AVs), particularly autonomous tractor trailers, the ability to recognize a malfunction in its systems and stop safely can allow for a lawful and safe operation of the vehicle. Described below in detail are systems and methods for the safe and lawful operation of an autonomous vehicle on a roadway, including the execution of maneuvers that bring the autonomous vehicle in compliance with the law while signaling surrounding vehicles of its condition.

This patent document describes in Section I below an example vehicle ecosystem of an autonomous vehicle and driving related operations of the autonomous vehicle. Sections II and V describe a control center or oversight system for one or more autonomous vehicles, as well as various example features thereof and operations/processes performed thereby. Sections III, IV, and VI to XV describe operations performed by the autonomous vehicle in various scenarios. The example headings for the various sections below are used to facilitate the understanding of the disclosed subject matter and do not limit the scope of the claimed subject matter in any way. Accordingly, one or more features of one example section can be combined with one or more features of another example section.

This patent document uses many abbreviations and uncommon terms. For instance, "GNSS" or "GPS" may refer to satellite navigation systems; when referring to an emergency vehicle, such as a police vehicle, ambulance, fire truck, tow truck, and the like, the abbreviation "EV" may be used; the acronym "TTC" indicates "time to collision"; "NPC" refers to non-player characters and may include any other vehicle that is not the autonomous vehicle in FIG. 1. For example, any surrounding vehicle, motorcycle, bicycle, and the like that are manually driven or autonomously driven and that may not be in communication with the autonomous vehicle may be considered NPC; a "k-ramp" denotes a freeway on/off ramp of a particular configuration; "STV" indicates a stopped vehicle; and "ELV" may indicate an end-of-life or disabled vehicle, such as a disabled vehicle on a roadside.

I. Example Ecosystem of an Autonomous Vehicle

Figure 1:
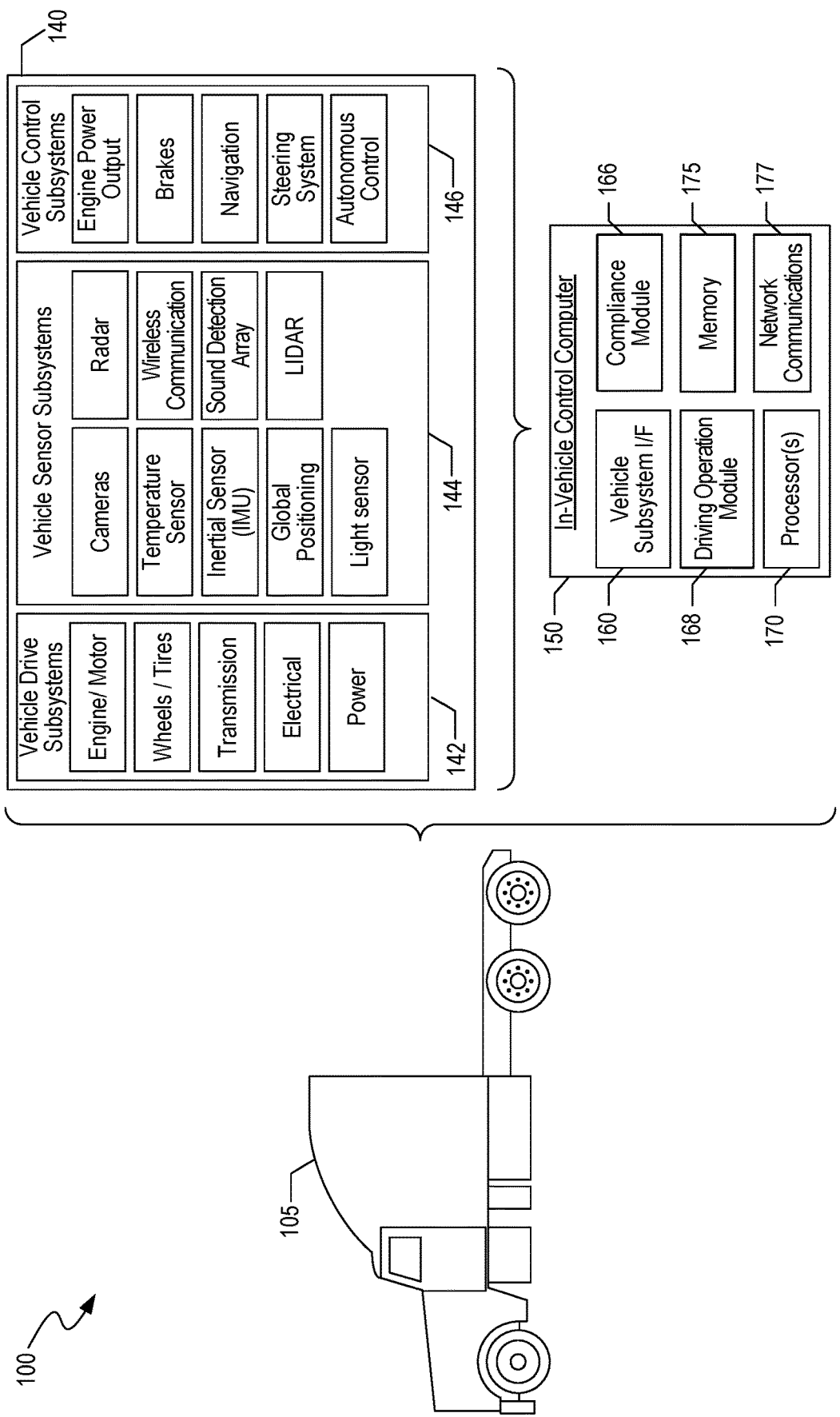
FIG. 1 illustrates a block diagram of an example vehicle ecosystem of an autonomous vehicle.

FIG. 1 shows a system 100 that includes an autonomous vehicle 105. The autonomous vehicle 105 may include a tractor of a semi-trailer truck. The autonomous vehicle 105 includes a plurality of vehicle subsystems 140 and an in-vehicle control computer 150. The plurality of vehicle subsystems 140 includes vehicle drive subsystems 142, vehicle sensor subsystems 144, and vehicle control subsystems 146. An engine or motor, wheels and tires, a transmission, an electrical subsystem, and a power subsystem may be included in the vehicle drive subsystems. The engine of the autonomous vehicle 105 may be an internal combustion engine, a fuel-cell powered electric engine, a battery powered electrical engine, a hybrid engine, or any other type of engine capable of moving the wheels on which the autonomous vehicle 105 moves. The autonomous vehicle 105 have multiple motors or actuators to drive the wheels of the vehicle, such that the vehicle drive subsystems 142 include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystem may include components that regulate the power source of the vehicle.

Vehicle sensor subsystems 144 can include sensors for general operation of the autonomous vehicle 105, including those which would indicate a malfunction in the autonomous vehicle or another cause for an autonomous vehicle to perform a limited or minimal risk condition (MRC) maneuver or an emergency driving maneuver. A driving operation module (shown as 168 in FIG. 1) can perform an MRC maneuver by sending instructions that cause the autonomous vehicle to steer along a trajectory to a side of the road and to apply brakes so that the autonomous vehicle can be safely stopped to the side of the road. The sensors for general operation of the autonomous vehicle may include cameras, a temperature sensor, an inertial sensor (IMU), a global positioning system, a light sensor, a LIDAR system, a radar system, and wireless communications.

A sound detection array, such as a microphone or array of microphones, may be included in the vehicle sensor subsystem 144. The microphones of the sound detection array are configured to receive audio indications of the presence of, or instructions from, authorities, including sirens and command such as "Pull over." These microphones are mounted, or located, on the external portion of the vehicle, specifically on the outside of the tractor portion of an autonomous vehicle 105. Microphones used may be any suitable type, mounted such that they are effective both when the autonomous vehicle 105 is at rest, as well as when it is moving at normal driving speeds.

Cameras included in the vehicle sensor subsystems 144 may be rear-facing so that flashing lights from emergency vehicles may be observed from all around the autonomous vehicle 105. These cameras may include video cameras, cameras with filters for specific wavelengths, as well as any other cameras suitable to detect emergency vehicle lights based on color, flashing, of both color and flashing.

The vehicle control subsystem 146 may be configured to control operation of the autonomous vehicle, or truck, 105 and its components. Accordingly, the vehicle control subsystem 146 may include various elements such as an engine power output subsystem, a brake unit, a navigation unit, a steering system, and an autonomous control unit. The engine power output may control the operation of the engine, including the torque produced or horsepower provided, as well as provide control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more pre-determined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR (e.g., LIDAR), the cameras, and/or other vehicle subsystems to determine the driving path or trajectory for the autonomous vehicle 105. The autonomous control that may activate systems that the autonomous vehicle 105 has which are not present in a conventional vehicle, including those systems which can allow an autonomous vehicle to communicate with surrounding drivers or signal surrounding vehicles or drivers for safe operation of the autonomous vehicle.

An in-vehicle control computer 150, which may be referred to as a VCU, includes a vehicle subsystem interface 160, a driving operation module 168, one or more processors 170, a compliance module 166, a memory 175, and a network communications subsystem 178. This in-vehicle control computer 150 controls many, if not all, of the operations of the autonomous vehicle 105 in response to information from the various vehicle subsystems 140. The one or more processors 170 execute the operations that allow the system to determine the health of the autonomous vehicle, such as whether the autonomous vehicle has a malfunction or has encountered a situation requiring service or a deviation from normal operation and giving instructions. Data from the vehicle sensor subsystems 144 is provided to VCU 150 so that the determination of the status of the autonomous vehicle can be made. The compliance module 166 determines what action should be taken by the autonomous vehicle 105 to operate according to the applicable (e.g., local) regulations. Data from other vehicle sensor subsystems 144 may be provided to the compliance module 166 so that the best course of action in light of the autonomous vehicle's status may be appropriately determined and performed. Alternatively, or additionally, the compliance module 166 may determine the course of action in conjunction with another operational or control module, such as the driving operation module 168.

The memory 175 may contain additional instructions as well, including instructions to transmit data to, receive data from, interact with, or control one or more of the vehicle drive subsystem 142, the vehicle sensor subsystem 144, and the vehicle control subsystem 146 including the autonomous Control system. The in-vehicle control computer (VCU) 150 may control the function of the autonomous vehicle 105 based on inputs received from various vehicle subsystems (e.g., the vehicle drive subsystem 142, the vehicle sensor subsystem 144, and the vehicle control subsystem 146). Additionally, the VCU 150 may send information to the vehicle control subsystems 146 to direct the trajectory, velocity, signaling behaviors, and the like, of the autonomous vehicle 105. For example, compliance module 166 and/or the driving operation module 168 in the VCU 150 may send instructions to one or more devices of the autonomous vehicle 105. The one or more devices may include one or more devices in the vehicle drive subsystems 142, the vehicle sensor subsystems 144, or the vehicle control subsystems 146. These instructions sent by the VCU 150 to one or more devices in the autonomous vehicle 105 are configured to effectuate and result in certain operations and actions being performed by the one or more devices in accordance with the instructions. Operations resulting from the instructions being sent to the one or more devices may together form driving related operations performed by the autonomous vehicle 105. For example, the VCU 150 may send instructions to a motor in the steering system, to an actuator in a brake unit, an/or to the engine to cause one or more devices to operate in accordance with the instructions such that the autonomous vehicle 105 performs a maneuver, or steers to follow a trajectory at a specified (e.g., via the instructions) velocity and/or acceleration/deceleration. Thus, the instructions provided by the VCU 150 can allow the autonomous vehicle 105 to follow a trajectory to steer from a current lane on which the autonomous vehicle 105 is operating to an adjacent lane or to a shoulder area (e.g., emergency stopping lane or area on side of the roadway) on the roadway. The autonomous control vehicle control subsystem may receive a course of action to be taken from the compliance module 166 of the VCU 150 and consequently relay instructions to other subsystems to execute the course of action. In Sections III to XV below, this patent document describes that the autonomous vehicle or a system performs certain functions or operations. These functions and/or the operations described can be performed by the compliance module 166 and/or the driving operation module 168.

Figure 2:
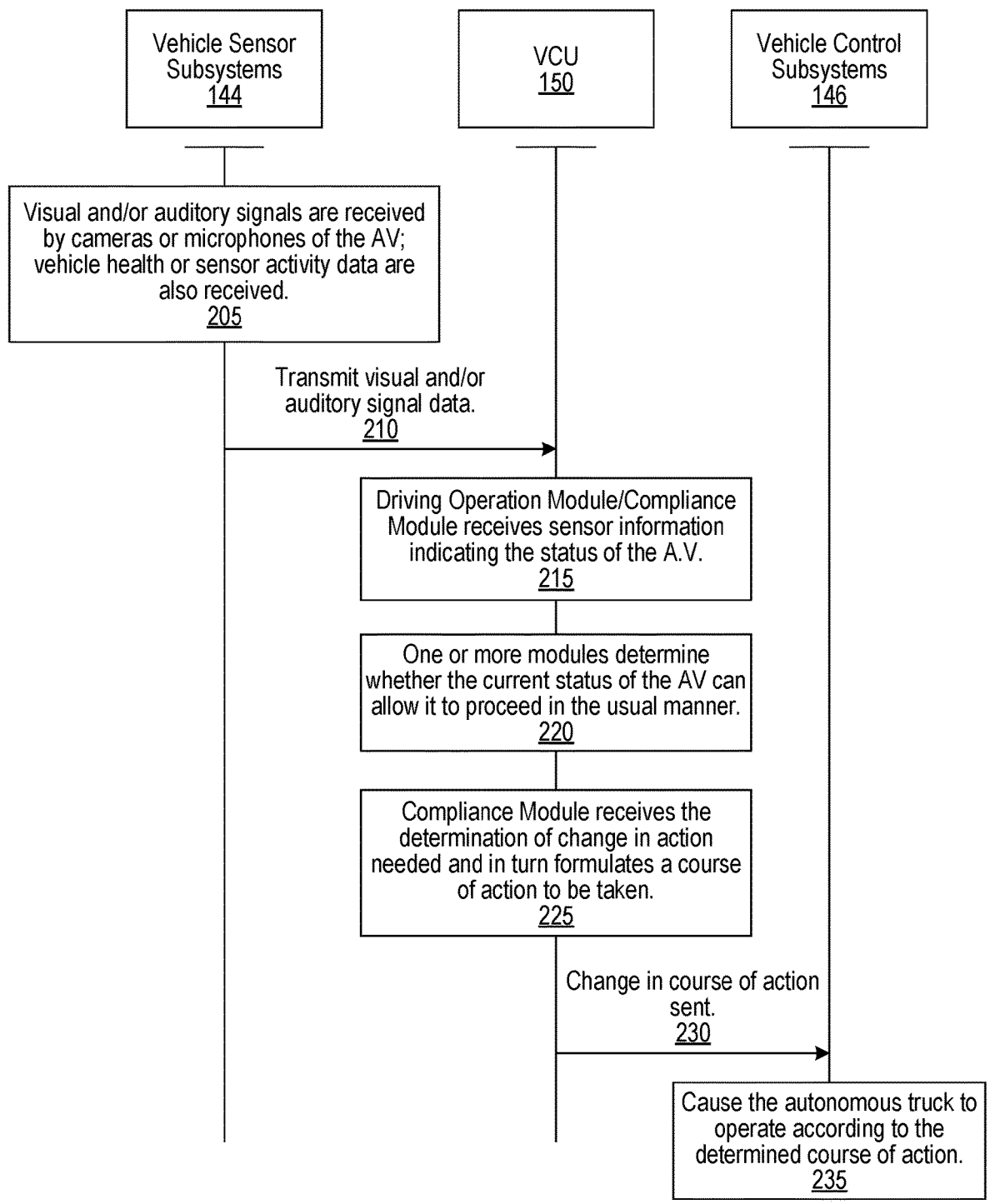
FIG. 2 shows a flow diagram for safe operation of an autonomous vehicle safely in light of the health and/or surroundings of the autonomous vehicle.

FIG. 2 shows a flow diagram for safe operation of an autonomous vehicle (AV) safely in light of the health and/or surroundings of the autonomous vehicle. Although this figure depicts functional steps in a particular order for purposes of illustration, the process is not limited to any particular order or arrangement of steps. One skilled in the relevant art will appreciate that the various steps portrayed in this figure may be omitted, rearranged, combined and/or adapted in various ways.

As shown in FIG. 2, the vehicle sensor subsystem 144 receives visual, auditory, or both visual and auditory signals indicating the at the environmental condition of the autonomous vehicle, as well as vehicle health or sensor activity data are received in step 205. These visual and/or auditory signal data are transmitted from the vehicle sensor subsystem 144 to the in-vehicle control computer system (VCU) 150, as in step 210. Any of the driving operation module and the compliance module receive the data transmitted from the vehicle sensor subsystem, in step 215. Then, one or both of those modules determine whether the current status of the autonomous vehicle can allow it to proceed in the usual manner or that the autonomous vehicle needs to alter its course to prevent damage or injury or to allow for service in step 220. The information indicating that a change to the course of the autonomous vehicle is needed may include an indicator of sensor malfunction; an indicator of a malfunction in the engine, brakes, or other components that may be necessary for the operation of the autonomous vehicle; a determination of a visual instruction from authorities such as flares, cones, or signage; a determination of authority personnel present on the roadway; a determination of a law enforcement vehicle on the roadway approaching the autonomous vehicle, including from which direction; and a determination of a law enforcement or first responder vehicle moving away from or on a separate roadway from the autonomous vehicle. This information indicating that a change to the autonomous vehicle's course of action or driving related operation is needed may be used by the compliance module to formulate a new course of action to be taken which accounts for the autonomous vehicle's health and surroundings, in step 225. The course of action to be taken may include slowing, stopping, moving into a shoulder, changing route, changing lane while staying on the same general route, and the like. The course of action to be taken may include initiating communications with any oversight or human interaction systems present on the autonomous vehicle. The course of action to be taken may then be transmitted from the VCU 150 to the autonomous control system, in step 230. The vehicle control subsystems 146 then cause the autonomous vehicle 105 to operate in accordance with the course of action to be taken that was received from the VCU 150 in step 235.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

II. Autonomous Vehicle Oversight System

Figure 3:
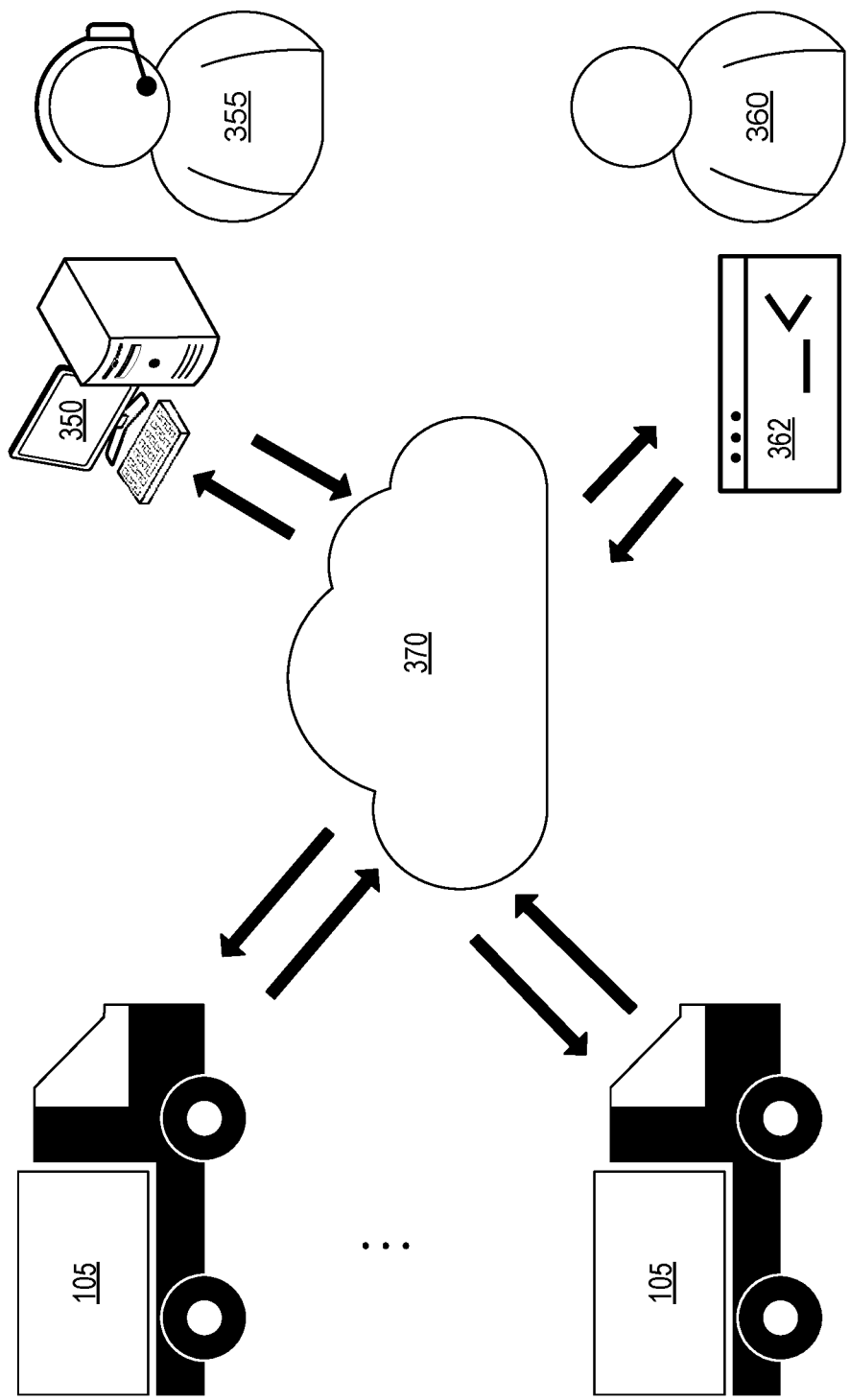
FIG. 3 illustrates a system that includes one or more autonomous vehicles, a control center or oversight system with a human operator (e.g., a remote center operator (RCO)), and an interface for third-party interaction.

FIG. 3 illustrates a system 300 that includes one or more autonomous vehicles 105, a control center or oversight system 350 with a human operator 355, and an interface 362 for third-party 360 interaction. A human operator 355 may also be known as a remoter center operator (RCO). Communications between the autonomous vehicles 105, oversight system 350 and user interface 362 take place over a network 370. In some instances, where not all the autonomous vehicles 105 in a fleet are able to communicate with the oversight system 350, the autonomous vehicles 105 may communicate with each other over the network 370 or directly. As described with respect to FIG. 1, the VCU 150 of each autonomous vehicle 105 may include a module for network communications 178.

An autonomous vehicle may be in communication with an oversight system. The oversight system may serve many purposes, including: tracking the progress of one or more autonomous vehicles (e.g., an autonomous truck); tracking the progress of a fleet of autonomous vehicles; sending maneuvering instructions to one or more autonomous vehicles; monitoring the health of the autonomous vehicle(s); monitoring the status of the cargo of each autonomous vehicle in contact with the oversight system; facilitate communications between third parties (e.g., law enforcement, clients whose cargo is being carried) and each, or a specific, autonomous vehicle; allow for tracking of specific autonomous vehicles in communication with the oversight system (e.g., third-party tracking of a subset of vehicles in a fleet); arranging maintenance service for the autonomous vehicles (e.g., oil changing, fueling, maintaining the levels of other fluids); alerting an affected autonomous vehicle of changes in traffic or weather that may adversely impact a route or delivery plan; pushing over the air updates to autonomous vehicles to keep all components up to date; and other purposes or functions that improve the safety for the autonomous vehicle, its cargo, and its surroundings. An oversight system may also determine performance parameters of an autonomous vehicle or autonomous truck, including any of: data logging frequency, compression rate, location, data type; communication prioritization; how frequently to service the autonomous vehicle (e.g., how many miles between services); when to perform a minimal risk condition (MRC) maneuver while monitoring the vehicle's progress during the maneuver; when to hand over control of the autonomous vehicle to a human driver (e.g., at a destination yard); ensuring an autonomous vehicle passes pre-trip inspection; ensuring an autonomous vehicle performs or conforms to legal requirements at checkpoints and weight stations; ensuring an autonomous vehicle performs or conforms to instructions from a human at the site of a roadblock, cross-walk, intersection, construction, or accident; and the like.

Included in some of the functions executed by an oversight system or command center is the ability to relay over-the-air, real-time weather updates to autonomous vehicles in a monitored fleet. The over-the-air weather updates may be pushed to all autonomous vehicles in the fleet or may be pushed only to autonomous vehicles currently on a mission to deliver a cargo. Alternatively, or additionally, priority to push or transmit over-the-air weather reports may be given to fleet vehicles currently on a trajectory or route that leads towards or within a pre-determined radius of a severe weather event.

Another function that may be encompassed by the functions executed by an oversight system or command center is the transmission of trailer metadata to the autonomous vehicle's computing unit (VCU) prior to the start of a cargo transport mission. The trailer metadata may include the type of cargo being transmitted, the weight of the cargo, temperature thresholds for the cargo (e.g., trailer interior temperature should not fall below or rise above pre-determined temperatures), time-sensitivities, acceleration/deceleration sensitivities (e.g., jerking motion may be bad because of the fragility of the cargo), trailer weight distribution along the length of the trailer, cargo packing or stacking within the trailer, and the like.

To allow for communication between autonomous vehicles in a fleet and an oversight system or command center, each autonomous vehicle may be equipped with a communication gateway. The communication gateway may have the ability to do any of the following: allow for autonomous vehicle to oversight system communication (e.g. V2C) and the oversight system to autonomous vehicle communication (C2V); allow for autonomous vehicle to autonomous vehicle communication within the fleet (V2V); transmit the availability or status of the communication gateway; acknowledge received communications; ensure security around remote commands between the autonomous vehicle and the oversight system; convey the autonomous vehicle's location reliably at set time intervals; enable the oversight system to ping the autonomous vehicle for location and vehicle health status; allow for streaming of various sensor data directly to the command or oversight system; allow for automated alerts between the autonomous vehicle and oversight system; comply to ISO 21434 standards; and the like.

An oversight system or command center may be operated by one or more human, also known as an operator or a remote center operator (RCO). The operator may set thresholds for autonomous vehicle health parameters, so that when an autonomous vehicle meets or exceeds the threshold, precautionary action may be taken. Examples of vehicle health parameters for which thresholds may be established by an operator may include any of: fuel levels; oil levels; miles traveled since last maintenance; low tire-pressure detected; cleaning fluid levels; brake fluid levels; responsiveness of steering and braking subsystems; Diesel exhaust fluid (DEF) level; communication ability (e.g., lack of responsiveness); positioning sensors ability (e.g., GPS, IMU malfunction); impact detection (e.g., vehicle collision); perception sensor ability (e.g., camera, LIDAR, radar, microphone array malfunction); computing resources ability (e.g., VCU or ECU malfunction or lack of responsiveness, temperature abnormalities in computing units); angle between a tractor and trailer in a towing situation (e.g., tractor-trailer, 18-wheeler, or semi-truck); unauthorized access by a living entity (e.g., a person or an animal) to the interior of an autonomous truck; and the like. The precautionary action may include execution of a minimal risk condition (MRC) maneuver, seeking service, or exiting a highway or other such re-routing that may be less taxing on the autonomous vehicle. An autonomous vehicle whose system health data meets or exceeds a threshold set at the oversight system or by the operator may receive instructions that are automatically sent from the oversight system to perform the precautionary action.

The operator may be made aware of situations affecting one or more autonomous vehicles in communication with or being monitored by the oversight system that the affected autonomous vehicle(s) may not be aware of. Such situations may include: irregular or sudden changes in traffic flow (e.g., traffic jam or accident); abrupt weather changes; abrupt changes in visibility; emergency conditions (e.g., fire, sinkhole, bridge failure); power outage affecting signal lights; unexpected road work; large or ambiguous road debris (e.g., object unidentifiable by the autonomous vehicle); law enforcement activity on the roadway (e.g., car chase or road clearing activity); and the like. These types of situations that may not be detectable by an autonomous vehicle may be brought to the attention of the oversight system operator through traffic reports, law enforcement communications, data from other vehicles that are in communication with the oversight system, reports from drivers of other vehicles in the area, and similar distributed information venues. An autonomous vehicle may not be able to detect such situations because of limitations of sensor systems or lack of access to the information distribution means (e.g., no direct communication with weather agency). An operator at the oversight system may push such information to affected autonomous vehicles that are in communication with the oversight system. The affected autonomous vehicles may proceed to alter their route, trajectory, or speed in response to the information pushed from the oversight system. In some instances, the information received by the oversight system may trigger a threshold condition indicating that MRC (minimal risk condition) maneuvers are warranted; alternatively, or additionally, an operator may evaluate a situation and determine that an affected autonomous vehicle should perform an MRC maneuver and subsequently send such instructions to the affected vehicle. In these cases, each autonomous vehicle receiving either information or instructions from the oversight system or the oversight system operator uses its on-board computing unit (e.g. VCU) to determine how to safely proceed, including performing a MRC maneuver that includes pulling-over or stopping.

Other interactions that the remote center operator (RCO) may have with an autonomous vehicle or a fleet of autonomous vehicle includes any of the following: pre-planned event avoidance; real-time route information updates; real-time route feedback; trail hookup status; first responder communication request handling; notification of aggressive surrounding vehicle(s); identification of construction zone changes; status of an autonomous vehicle with respect to its operational design domain (ODD), such as alerting the RCO when an autonomous vehicle is close to or enters a status out of ODD; RCO notification of when an autonomous vehicle is within a threshold distance from a toll booth and appropriate instruction/communication with the autonomous vehicle or toll authority may be sent to allow the autonomous vehicle to bypass the toll; RCO notification of when an autonomous vehicle bypasses a toll; RCO notification of when an autonomous vehicle is within a threshold distance from a weigh station and appropriate instruction/communication with the autonomous vehicle or appropriate authority may be sent to allow the autonomous vehicle to bypass the weigh station; RCO notification of when an autonomous vehicle bypasses a weigh station; notification to the autonomous vehicle from the RCO regarding scheduling or the need for fueling or maintenance; RCO authorization of third-party access to an autonomous vehicle cab; ability of an RCO to start/restart an autonomous driving system (ADS) on a vehicle; ability of an administrator (possibly an RCO) to set roles for system users, including ground crew, law enforcement, and third parties (e.g., customers, owners of the cargo); support from a RCO for communication with a service maintenance system with fleet vehicles; notification to the RCO from an autonomous vehicle of acceleration events; instruction from a RCO to an autonomous vehicle to continue its mission even when communication is interrupted; RCO monitoring of an autonomous vehicle during and after an MRC maneuver is executed; support for continuous communication between an autonomous vehicle and a yard operator at facility where the autonomous vehicle is preparing to begin a mission or where the autonomous vehicle is expected to arrive; oversight system monitoring of software systems on an autonomous vehicle and oversight system receiving alerts when software systems are compromised; and the like.

An oversight system or command center may allow a third party to interact with the oversight system operator, with an autonomous vehicle, or with both the human system operator and an autonomous vehicle. A third party may be a customer whose goods are being transported, a law enforcement or emergency services provider, or a person assisting the autonomous vehicle when service is needed. In its interaction with a third party, the oversight system may recognize different levels of access, such that a customer concerned about the timing or progress of a shipment may only be allowed to view status updates for an autonomous vehicle, or may able to view status and provide input regarding what parameters to prioritize (e.g., speed, economy, maintaining originally planned route) to the oversight system. By providing input regarding parameter prioritization to the oversight system, a customer can influence the route and/or operating parameters of the autonomous vehicle.

Actions that an autonomous vehicle, particularly an autonomous truck, as described herein may be configured to execute to safely traverse a course while abiding by the applicable rules, laws, and regulations may include those actions successfully accomplished by an autonomous truck driven by a human. These actions, or maneuvers, may be described as features of the truck, in that these actions may be executable programming stored on the VCU 150 (the in-vehicle control computer unit). These actions or features may include those related to reactions to the detection of certain types of conditions or objects such as: appropriate motion on hills; appropriate motion on curved roads, appropriate motion at highway exits; appropriate motion or action in response to: detecting of one or more stopped vehicle, detecting one or more vehicles in an emergency lane; detecting an emergency vehicle with flashing lights that may be approaching the autonomous vehicle; motion in response to detecting on or more large vehicles approaching, adjacent to, or soon, to be adjacent to the autonomous vehicle; motions or actions in response to pedestrians, bicyclists, and the like after identification and classification of such actors; motions or actions in response to curved or banked portions of the roadway; and/or motions in response to identifying on and off ramps on highways or freeways, encountering an intersection; execution of a merge into traffic in an adjacent lane or area of traffic; detection of need to clean one or more sensor and the cleaning of the appropriate sensor; identification of law enforcement/emergency vehicles and personnel and compliance with associated instructions or regulations; execution of minimal risk condition maneuvers when needed; and identification of road debris or unknown objects; and the like. Other features of an autonomous vehicle may include those actions or features which are needed for any type of maneuvering, including that needed to accomplish the features or actions that are reactionary, listed above.

Supporting features may include: changing lanes safely; operating turn signals on the autonomous vehicle to alert other drivers of intended changes in motion; biasing the autonomous vehicle in its lane (e.g., moving away from the center of the lane to accommodate the motions or sizes of neighboring vehicles or close objects); ability to maintain an appropriate following distance; the ability to turn right and left with appropriate signaling and motion, and the like. Supporting features may also include: the ability to navigate roundabouts; the ability to properly illuminate with on-vehicle lights as-needed for ambient light and for compliance with local laws; apply the minimum amount of deceleration needed for any given action; determine location at all times; adapting dynamic vehicle control for trailer load distributions, excluding wheel adjustment; launching (reaching target speed), accelerating, stopping, and yielding; operate on roadways with bumps and potholes; enter a minimal risk condition (MRC) on roadway shoulders; access local laws and regulations based on location along a route; operate on asphalt, concrete, mixed grading, scraped road, and gravel; ability to operate in response to metering lights/signals at on-ramps; operate on a roadway with a width up to a pre-determined width; able to stop at crosswalks with sufficient stopping distance; navigate two-way left turn lanes; operate on roadways with entry and exit ramps; utilize the vehicle horn to communicate with other drivers; and the like. One or more features and/or one or more supporting features described in this patent document may combined and can be performed by the in-vehicle control computer in an autonomous vehicle.

In some embodiments, the actions or features may be considered supporting features and may include: speed control; the ability to maintain a straight path; and the like. These supporting features, as well as the reactionary features listed above, may include controlling or altering the steering, engine power output, brakes, or other vehicle control subsystems 146. The reactionary features and supporting features listed above are discussed in greater detail below.

III. Minimal Risk Condition (MRC)

An autonomous vehicle may perform a limited or minimal risk condition (MRC) maneuver utilizing its own sensors and controls systems. An MRC maneuver, also known as a minimal risk condition maneuver, may be required in response to a deterioration in the system health of the autonomous vehicle, due to weather or other conditions external to the autonomous vehicle, or otherwise in response to detection and/or triggering of a defined fault condition. An autonomous vehicle is required to have an operational design domain (ODD) for each autonomous driving system on the autonomous vehicle. When an autonomous vehicle senses or detects that it is beginning to operate outside of its ODD, is malfunctioning, or is operating in a degraded state, the autonomous vehicle may perform a minimal risk condition maneuver. Alternatively, or additionally, an oversight system or control center may determine that an autonomous vehicle needs to perform an MRC maneuver because the traffic or weather make it unsafe for the autonomous vehicle to proceed, the health indicators of the autonomous vehicle have reached certain predetermined thresholds, the cargo needs attention, or the like. In such circumstances, the oversight system or control center may send instructions to an autonomous vehicle to perform the appropriate MRC maneuver.

A minimal risk condition (MRC) maneuver may be executed in a way that minimizes erratic driving or handling of the autonomous vehicle while removing the autonomous vehicle from hazardous situations, if possible. An example MRC maneuver may include stopping in the current lane of travel on a roadway or highway; pulling over to the side of the road or onto a highway shoulder and then stopping; and exiting a highway and then stopping.

III-A. MRC General Behavior

The following sections III-A.(a) to III-A.(i) describe example aspects and embodiments related to general behavior of an autonomous vehicle during minimal risk condition (MRC) maneuvers and procedures.

III-A.(a) MRC General Behavior—MRC Maneuver Definitions

In various embodiments, an autonomous driving system may be able to execute the following MRC maneuvers to achieve a minimal risk condition:

Proceeding while systems are degraded: the autonomous vehicle may preferentially move to the slow lane of the current roadway, slow to the minimum speed allowed by the regional law, and increase distance between itself and the nearest vehicles. The slow lane may vary from area to area, but generally in the United States the slow lane of a highway is the right-most through lane (e.g., a lane that is not an exit-only lane or that terminates or is closed ahead). The minimum speed allowed by law for may highways or freeways may be 45 mph when traffic is free flowing, but may be less than that when there is congestion on the roadway. The distance between the autonomous vehicle and its nearest vehicular neighbors may be increased by a safety factor, to allow the autonomous driving system to have more time to react to changes in velocity or trajectory of those surrounding vehicles. This safety factor may be 1.5 times the distance, 2 times the distance, or 2.5 times the distance between vehicles prior to triggering the MRC.

MRC1: the autonomous vehicle may pull over to a pre-mapped safe area on the side of the road. The pre-mapped safe area on the side of the road or off of a lane in which the autonomous vehicle is operating may include a shoulder area or an emergency stopping lane adjacent one or more lane on the roadway where the autonomous vehicle can be brought to a complete stop. A complete stop may refer to a state of the autonomous vehicle in which the velocity of the autonomous vehicle is close to zero or when the autonomous vehicle is not in motion due to its own propulsion (e.g., the engine). In various embodiments, the autonomous vehicle may be brought to a complete stop at an area located on the shoulder area of the road, on an unpaved area next to the road, or the like. For example, a pre-mapped safe area may be positioned on the right side of the road. The autonomous vehicle may avoid making contact with an emergency lane vehicle (ELV) when performing an MRC1 maneuver. In various embodiments, an MRC1 maneuver may include a maneuver in which the autonomous vehicle reaches a complete stop off of its current lane, which may include reaching a complete stop in a different lane of the road in which the autonomous vehicle is currently operating. The pre-mapped safe area may also include a runaway truck ramp or a runaway truck lane. The on-board sensors in conjunction with the autonomous driving system and control system of the autonomous vehicle may enable it to complete an MRC1 maneuver. In some implementations, when the status or health of the on-board sensors is degraded the selection of the pre-mapped safe area may be influenced by the ability to reliably identify the intended pre-mapped safe area as well as to plan and traverse a trajectory to that intended pre-mapped safe area.

MRC2: the autonomous driving system may execute and come to an emergency stop in the current driving lane. The deceleration may not exceed a threshold value (e.g., 3 m/s$^2$, 4 m/s$^2$, 5 m/s$^2$). The threshold value may be adjusted for driving conditions, such as the road surface (e.g., wet, dry, icy, loose gravel), perception limitations (e.g., visibility issues due to fog or dust, interference by the sun at a certain angle, lack of sufficient light to identify distant objects), or traffic. The threshold value for deceleration may be determined to allow the autonomous vehicle to safely stop, without causing harm to the autonomous vehicle or surrounding vehicles, such as threshold deceleration rate that prevents jack-knifing of tractor-trailer vehicles or a vehicle to become overturned.

MRC3: the autonomous driving system may execute a gentle stop in the current driving lane; that is, the autonomous vehicle steadily comes to a stop in the current lane. The autonomous driving system may be able to delay the deceleration when satisfying regulatory constraints, avoiding the merge area of a k-ramp, missing an intended exit, being forced off the highway, or approaching the map's boundary. An MRC3 maneuver may be associated with guidance that the deceleration rate may not exceed a threshold value (e.g., 1.40 m/s$^2$, 1.42 m/s$^2$, 1.47 m/s$^2$, 1.52 m/s$^2$, 1.60 m/s$^2$), unless a greater rate of deceleration is required for obstacle avoidance.

According to some example embodiments, a minimal risk condition (as achieved by the autonomous vehicle through execution of one of the above MRC maneuvers, for example) may be defined as a condition to which a user or an Automated Driving System (ADS) may bring a vehicle after performing the Dynamic Driving Task (DDT) fallback in order to reduce the risk of a crash when a given trip cannot or should not be completed. For example, this description can be supported by the SAE J3016.

At levels 4 and 5 of autonomy as defined by SAE, the autonomous driving system is capable of automatically achieving a minimal risk condition when necessary (e.g., due to ODD exit, if applicable, or due to a DDT performance-relevant system failure in the ADS or vehicle). The characteristics of automated achievement of a minimal risk condition at levels 4 and 5 will vary according to the type and extent of the system failure, the ODD (if any) for the ADS feature in question, and the particular operating conditions when the system failure or ODD exit occurs. It may entail automatically bringing the vehicle to a stop within its current travel path, or it may entail a more extensive maneuver designed to remove the vehicle from an active lane of traffic and/or to automatically return the vehicle to a dispatching facility.

According to some example embodiments, a minimal risk condition may be defined as a low-risk operating mode in which a fully autonomous vehicle operating without a human person achieves a reasonably safe state, such as bringing the vehicle to a complete stop, upon experiencing a failure of the vehicle's automated driving system that renders the vehicles unable to perform the entire dynamic driving task. For example, this definition is taken by the State of Arizona. Alternatively, or additionally, a minimal risk condition may include bringing an autonomous vehicle to a complete stop upon experiencing a degradation or failure of one or more of the mechanical systems of the vehicle.

The autonomous driving system may trigger the MRC2 or MRC3 maneuver if it has been attempting an MRC1 maneuver for longer than a threshold amount of time (e.g., 15 minutes, 20 minutes, 30 minutes) or for a greater than a threshold distance (e.g., 16,000 meters, 24,000 meters, 36,000 meters, 36,250 meters). In some embodiments, the threshold amount of time/the threshold distance may be dependent upon the nature of the failure or degradation as well as the speed of the autonomous vehicle when the MRC1 maneuver was first attempted. In various embodiments, a first maneuver may be first selected to be an MRC1 maneuver, and responsive to a determination that the autonomous vehicle has not reached a complete stop as it operates in accordance with the first maneuver (the MRC1 maneuver), then a second maneuver may be selected to bring the autonomous vehicle to a complete stop in its current lane (which may not be the lane in which the autonomous vehicle was operating when the first maneuver was selected and performed) via a MRC2 maneuver or a MRC3 maneuver. Depending on the threshold amount of time and the situational context, the "current lane" for which the second maneuver is configured to bring the autonomous vehicle to a complete stop can be the same lane in which the autonomous vehicle was operating when the first maneuver was selected (e.g., the autonomous vehicle has not changed lanes in the span of the threshold amount of time), can be adjacent to the original lane (e.g., the autonomous vehicle has performed one lane change), or can be separated from the original lane by at least one lane (e.g., the autonomous vehicle has performed more than one lane change).

In this patent document, a maneuver may generally refer to a driving related operation performed by the autonomous vehicle (e.g., changing lanes, slowing down, performing a turn, pulling over, coming to a complete stop) and can be defined by driving related information. The driving related information may include a trajectory information (e.g., a set of navigational points). The driving related information may also include instructions that can allow the autonomous vehicle to perform a maneuver in accordance with the instructions that are sent to one or more devices in the autonomous vehicle. For example, instructions may be sent to a brake unit subsystem, a motor in the steering system, and/or an engine power output subsystem so that one or more devices can operate in accordance with the instructions to result in the autonomous vehicle operating in accordance with a determined maneuver. Thus, the driving related information may describe or characterize driving related operations performed by the autonomous vehicle so that the autonomous vehicle can perform a certain maneuver.

In various embodiments, a minimal risk condition maneuver may generally refer to a maneuver configured to bring the autonomous vehicle to a minimal risk condition, for example, a complete stop. In accordance with the above, a minimal risk condition maneuver may include driving related information that includes instructions to be sent to one or more devices of the autonomous vehicle such that the one or more devices operate in accordance with the instructions to result in the autonomous vehicle reaching the minimal risk condition, or a complete stop for example. As discussed above, different MRC maneuvers (e.g., MRC1, MRC2, MRC3) may be configured to bring the autonomous vehicle to a complete stop at different areas, at different decelerations, and the like via different instructions that may be provided to devices on the autonomous vehicle such that the devices operate in different manners according to the different instructions.

III-A.(b) MRC General Behavior—Hazard Light Control

For all MRC maneuvers, the autonomous driving system may immediately turn on the hazard lights and keep them on until one or more human operators have taken control (e.g., via oversight system 350, in person). This may apply even if lane changes are required.

III-A.(c) MRC General Behavior—Stability

For all MRC maneuvers, the autonomous vehicle may avoid rolling over or jackknife. Abrupt changes in direction or harsh stopping may cause a rollover or jackknife of a tractor-trailer autonomous vehicle. Depending on the speed of the autonomous vehicle when an MRC maneuver is initiated, as well as the type of system degradation or failure, certain actions will be avoided by the vehicle control system. One or more inertial measurement units (IMUs) on-board the autonomous vehicle may provide data to the vehicle control system during an MRC maneuver to help the control system to know when a rollover or jackknife may be possible or imminent, and in response to such data, the vehicle control system may adjust the velocity and/or steering of the vehicle.

III-A.(d) MRC General Behavior—Safe Object Separation

For all MRC maneuvers, the autonomous driving system may maintain a safe separation from any nearby vehicles or objects, and the system may avoid colliding with any nearby vehicles or objects. Sensor data, either the last best data received or currently received data, may inform the actions of the autonomous driving system to avoid collisions with surrounding objects. When the failure or system degradation is in part of the sensor system, the autonomous driving system may reduce speed, even to the point of stopping, based on the last best sensor data and extrapolated data or further data from systems known to still be operational above a threshold level, such as above 60% or above 70% certainty, until the vehicle is safely stopped or otherwise in a MRC state.

III-A.(e) MRC General Behavior—Pre-Mapped Areas

To enable MRC1 maneuvers, an autonomous vehicle may pre-map designated safety areas for MRC1 maneuvers.

A pre-mapped safety area (e.g., as pre-mapped by the autonomous vehicle, as pre-mapped by an oversight system) may obey regulatory constraints that are outlined in predetermined relevant literature, such as applicable statutes or civil codes in the area in which the autonomous vehicle is executing the MRC maneuver.

A pre-mapped safety area may exclude any gore areas. A pre-mapped safety area may only consist of paved road. A pre-mapped safety area may be long enough such that the autonomous vehicle would be able to decelerate and come to a complete stop. For example, the length of a pre-mapped safety area could be greater than or equal to a predetermined distance, such as 50 meters, 60 meters, 70 meters, or 80 meters. Generally, the length of a pre-mapped safety area is based on the autonomous vehicle's current control capability and may be adjusted when the control module changes, such as when the control module improves its ability to determine the location of the pre-mapped safety area relative to the current position of the autonomous vehicle and to plan an appropriate trajectory to reach the safety area, or when the control modules improves its ability to control the steering or changes in velocity of the autonomous vehicle without causing jerking or other undesirable motion in the vehicle.

A pre-mapped safety area may be wide enough such that the autonomous vehicle's widest point would not penetrate a driving lane, or cross the shoulder's boundary.

The route taken by an autonomous vehicle may have at least one pre-mapped safety area every five minutes, under the assumption that the autonomous vehicle is traveling at the posted speed limit. In general, frequency of pre-mapping designated safety areas for MRC1 maneuvers by the autonomous vehicle may be based on the speed of the autonomous vehicle.

The pre-mapped safety area may be constrained to a particular side of a roadway. For instance, in jurisdictions in which the direction of travel is on the right side of a roadway, a pre-mapped safety area may only be located on the right side of the roadway.

III-A.(f) MRC General Behavior—Remain Static

An autonomous vehicle may be able to remain static indefinitely after an MRC maneuver has been completed. Following successful completion of an MRC maneuver, an autonomous vehicle may be repaired by a service technician, may be towed to a service location, may receive software updates over the air, or may stay stationary until the health of the autonomous vehicle reaches a level which will allow for navigation of the vehicle to a service station or terminal. For example, if it was detected that the engine of the autonomous vehicle was overheating, an autonomous vehicle may pull over with the completion of a MRC maneuver until the engine has returned to a safe operating temperature and it is determined that the vehicle systems will be able to maintain the safe operating temperature. In another example, after completion of a MRC maneuver that was triggered by a needed update to one or more components of the autonomous driving software, an update may be pushed to the stationary or static autonomous vehicle, an upon completion of the software update the autonomous vehicle may resume operation toward its original destination.

III-A.(g) MRC General Behavior—MRC Selection Preferences

In various embodiments, a maneuver may be determined for an autonomous vehicle in response to a determination of the occurrence of a fault condition or upon an MRC command based on a pre-determined order of a plurality of possible maneuvers. In some example embodiments, when MRC is requested and without comprising safety, an autonomous vehicle may prefer an MRC1 maneuver (e.g., pulling over into a pre-mapped safe area) when it is available, followed by an MRC3 maneuver (e.g., gradually coming to a stop in the current lane of travel), and then by a MRC2 maneuver (e.g., stopping as soon as possible in the current lane of travel without collision with other objects), for example. In various embodiments, availability of the MRC1 maneuver may be determined with respect to at least some of the regulatory constraints, operational constraints, and environmental constraints described in sections III-C, III-D, and III-e, respectively. For example, as described in section III-C.(d), the MRC1 maneuver may be determined to be unavailable while the autonomous vehicle is positioned within a highway tunnel. In various embodiments, the MRC1 maneuver may be determined to be unavailable if the autonomous vehicle (or the VCU 150) has not mapped any areas off of the lane in which the autonomous vehicle is operating at which the autonomous vehicle can reach a complete stop. In these examples, as described above, a maneuver in which the autonomous vehicle performs a complete stop in its current lane (e.g., MRC2 or MRC3) is selected, and the autonomous vehicle is caused to operate in accordance with the selected maneuver (e.g., by sending instructions to one or more devices on the autonomous vehicle).

In various embodiments, the order in which the availability of a MRC1 maneuver is determined first before considering MRC2 and MRC3 maneuvers may be pre-determined and performed in response to a determination of an occurrence of a fault condition. In some example embodiments, the pre-determined order upon which the selection of an MRC maneuver is based may be configurable before operation of the autonomous vehicle; for example, in some example scenarios, a pre-determined order may indicate that the availability of MRC3 is determined first before determining the availability of MRC1.

III-A.(h) MRC General Behavior—ELV Handling

When parking in front of an ELV (emergency lane vehicle, i.e., a vehicle stopped in an emergency lane or shoulder) for an MRC1 maneuver, an autonomous vehicle's tires may cross the lane boundary onto the pre-mapped safety area only once the rear bumper of the trailer is at least a pre-determined distance from the front bumper of the ELV. For example, the pre-determined distance may be in the range of 15 to 30 meters, such as 20 to 25 meters, including 20 meters.

III-A.(i) MRC General Behavior—Lane Keep

For all lane maneuvers, an autonomous vehicle may stay within the boundaries of the lane, unless required for obstacle avoidance or lane changes. The autonomous driving system may utilize sensor data to keep the autonomous vehicle within the boundaries of the current lane of travel. In some instances, depending on the nature of the degradation of the system, the autonomous vehicle may perform biasing within the lane, as needed.

III-B. MRC Triggers

The following sections III-B.(a) to III-B.(f) describe example triggers, fault conditions, regulatory requirements or guidelines, or the like that cause an autonomous vehicle to perform an MRC maneuver. The order, numbering, and organization of the following sections should not be construed as providing any description of priority, evaluation order, and/or the like of MRC triggers and fault conditions.

III-B.(a) MRC Triggers—Out-of-ODD (Operational Design Domain)

One or more human operators 355 may be able to trigger an MRC maneuver for an autonomous vehicle (e.g., via oversight system 350, via vehicle-to-vehicle communication through another vehicle) for all scenarios that are out of ODD, if needed. Alternatively, or additionally, an autonomous vehicle that determines that it is out of ODD, or that it may become out of ODD on its current trajectory, may trigger an MRC maneuver.

III-B.(b) MRC Triggers—Missing Exit

If an autonomous vehicle misses its intended exit, it may execute the safest appropriate MRC maneuver per other fault conditions described herein. For example, when missing an intended exit, an autonomous vehicle may perform an MRC3 maneuver (e.g., slow down in the current lane of travel before coming to a stop). Further, when an autonomous vehicle misses an intended exit and the following exit, the autonomous vehicle may perform an MRC3 maneuver if it is not in the process of performing an MRC3 maneuver.

III-B.(c) MRC Triggers—System Failure

Each hardware/software module of an autonomous vehicle may define potential failures and the corresponding degradation mode or MRC mode such that functional safety guidelines are met. The potential failure or degradation of each module may range from 10% functionality to fully functional, or the failure may be an on/off determination of a failure, such as a catastrophic failure.

III-B.(d) MRC Triggers—ODD Degradation

The autonomous driving system may be able to trigger an MRC maneuver for all degradation scenarios that are within the ODD (operational design domain) as needed. For example, while within areas that are mapped and known by an autonomous vehicle, the autonomous vehicle may be able to perform an MRC maneuver with degraded a visual sensor system because positioning systems may indicate where the autonomous vehicle is on the map.

III-B.(e) MRC Triggers—Approaching Map Boundary

When an autonomous vehicle's only available trajectory will result in reaching the map's boundary in a predetermined distance (e.g., 400 meters, 800 meters, 1000 meters, 1200 meters, 1600 meters) and an MRC maneuver is not already in progress, the autonomous vehicle may issue an MRC1 command (e.g., a command for execution of an MRC1 maneuver). However, the autonomous vehicle could not issue the MRC1 command when it is on a trajectory that is not expected to cross the map's boundary, even if the autonomous vehicle is within the predetermined threshold distance of the boundary.

III-B.(f) MRC Triggers—Forced Off Route

If an autonomous vehicle is forced off of its intended route, it may execute the safest appropriate MRC maneuver per other fault conditions described herein.

In various embodiments, the fault conditions or triggers may be determined to occur based on sensor data received by a computer located in the autonomous vehicle (e.g., the VCU 150). For example, the sensor data may include a signal or a message sent by one or more devices and received by the compliance module 166 and/or the driving operation module 168, where the signal or message indicates the condition of one or more devices in the autonomous vehicle (e.g., a motor, a brake, fluid temperature) from which the occurrence an ODD degradation fault condition may be determined.

The fault condition, or a trigger, can indicate a risk to the autonomous vehicle. In some embodiments, a risk to the autonomous vehicle may refer to a potential for damage to occur the autonomous vehicle (e.g., if a camera has degraded capability or if a road debris is detected), for loss of control of one or more devices on the autonomous vehicle, for degraded capability or performance of device(s) on the autonomous vehicle, and/or for failure or breakage of one or more devices on the autonomous vehicle.

Figure 5:
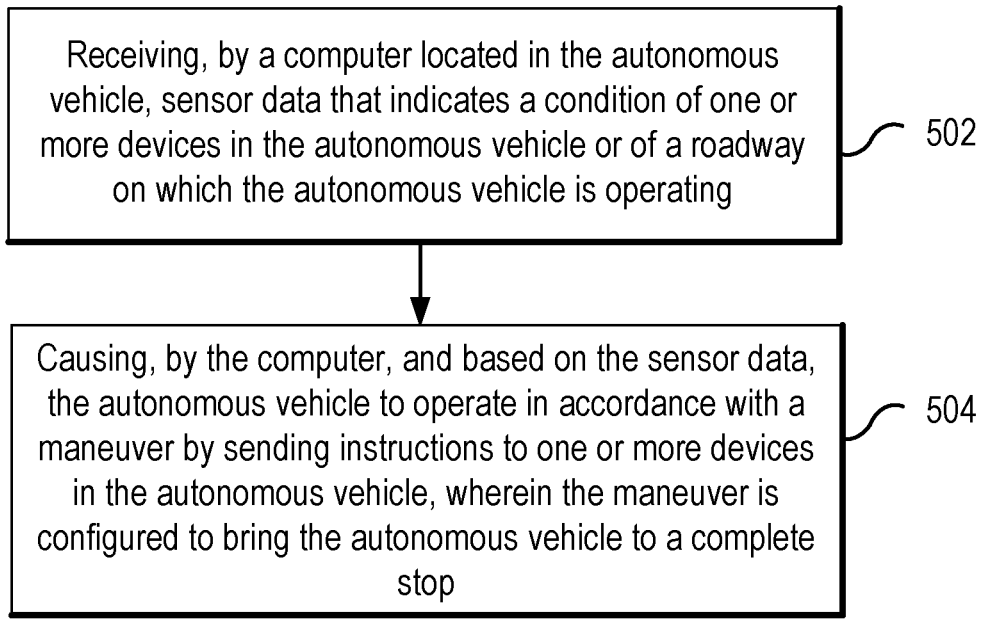
FIG. 5 shows an example flowchart of an autonomous driving operation performed by a vehicle to reach a minimal risk condition.

FIG. 5 shows an example flowchart of an autonomous driving operation performed by a vehicle to reach a minimal risk condition, such as when an MRC trigger or fault condition occurs. Operation 502 includes receiving, by a computer located in the autonomous vehicle, sensor data that indicates a condition of one or more devices in the autonomous vehicle or of a roadway on which the autonomous vehicle is operating. Operation 504 includes causing, by the computer, and based on the sensor data, the autonomous vehicle to operate in accordance with a maneuver by sending instructions to one or more devices in the autonomous vehicle, wherein the maneuver is configured to bring the autonomous vehicle to a complete stop.

In some embodiments, the maneuver is selected from a plurality of maneuvers in response to determining, based on the sensor data, an occurrence of a fault condition that indicates a risk to the autonomous vehicle. In some embodiments, the maneuver is selected to be a first maneuver that includes driving related information that when followed causes the autonomous vehicle to perform the complete stop at an area that is located off of a lane in which the autonomous vehicle is operating on the roadway. In some embodiments, the maneuver is selected to be a first maneuver that includes driving related information that when followed causes the autonomous vehicle to perform a deceleration at a first area that is located off of a lane in which the autonomous vehicle is operating on the roadway followed by the complete stop at a second area that is located off of the roadway. In some embodiments, the maneuver is selected from a plurality of maneuvers in response to receiving an indication of an occurrence of a fault condition that indicates a risk to the autonomous vehicle. In some embodiments, the maneuver is selected from a plurality of maneuvers in response to determining, based on the sensor data, an occurrence of a fault condition that indicates a risk to the autonomous vehicle that is located on the roadway.

In some embodiments, the autonomous driving operation further includes, in response to a determination that the autonomous vehicle has been operating in accordance with the first maneuver for a time longer than a pre-determined threshold without reaching an area to perform the complete stop, selecting a second maneuver that brings the autonomous vehicle to the complete stop in a lane in which the autonomous vehicle is operating on the roadway. In some embodiments, the maneuver is selected to be a second maneuver that includes driving related information that when followed causes the autonomous vehicle to perform the complete stop at a deceleration greater than a pre-determined threshold and in a lane in which the autonomous vehicle is operating on the roadway. In some embodiments, the maneuver is selected to be a third maneuver that includes driving related information that when followed causes the autonomous vehicle to perform the complete stop at a deceleration less than or equal to a pre-determined threshold and in a lane in which the autonomous vehicle is operating on the roadway In some embodiments, the maneuver is selected from the plurality of maneuvers based on a pre-determined order. In some embodiments, the pre-determined order indicates that a first maneuver is first selected to be the maneuver, wherein the first maneuver includes driving related information that when followed causes the autonomous vehicle to perform the complete stop at an area that is located off of a lane in which the autonomous vehicle is operating on the roadway; and in response to the first maneuver being unavailable, a second maneuver is selected to be the maneuver, wherein the second maneuver includes driving related information that when followed causes the autonomous vehicle to perform the complete stop in the lane in which the autonomous vehicle is operating on the roadway In some embodiments, the autonomous driving operation further includes transmitting an indication of the determining of the occurrence of the fault condition to a remote computer located in a location outside of the autonomous vehicle or to another autonomous vehicle. In some embodiments, the condition of the roadway indicated by the sensor data includes an image that includes a presence of road debris or one or more unknown objects on the roadway, and the fault condition includes a detection, from the image, of the road debris or the one or more unknown objects on the roadway on which the autonomous vehicle operates. In some embodiments, the autonomous driving operation further includes transmitting an indication of the detection of the road debris or the one or more unknown objects to a remote computer located in a location outside of the autonomous vehicle. In some embodiments, the first maneuver is selected based on whether the road debris or the one or more unknown objects are static or in motion.

In some embodiments, the receiving the sensor data that indicates the condition of the one or more devices in the autonomous vehicle includes receiving a signal or a message from a device in the autonomous vehicle, wherein the signal or the message indicates that the device has a degraded capability. In some embodiments, the occurrence of the fault condition is determined based on the signal or the message indicating that the device has the degraded capability.

In some embodiments, the autonomous driving operation further includes, prior to the causing of the autonomous vehicle to operate in accordance with the maneuver, determining a plurality of areas that are located off of a lane in which the autonomous vehicle is operating on the roadway, wherein the autonomous vehicle is expected to be driven to an area from the plurality of areas to bring the autonomous vehicle to the complete stop without collision in response to the sensor data indicating an occurrence of a fault condition.

III-C. MRC Regulatory Constraints

The following sections III-C.(a) to III-C.(k) describe example regulatory constraints related to MRC control and maneuvering of an autonomous vehicle. In general, an autonomous vehicle may behave according to local rules and regulations, except as necessary to avoid conflict with other traffic or to comply with other regulation or directions from a police officer or traffic control devices.

III-C.(a) MRC Regulatory Constraints—Safety Zone

The autonomous driving system may not complete an MRC1 maneuver (e.g., move to a pre-mapped safety area and stop) within a predetermined distance (e.g., 3 meters, 4 meters, 5 meters, 6 meters, 7 meters) of a regulatory safety zone. A regulatory safety zone may be defined as an area or space that is both: officially set apart within a roadway for the exclusive use of pedestrian and protected or either marked or indicated by adequate signs as to be plainly visible at all times while set apart as a safety zone.

III-C.(b) MRC Regulatory Constraints—Exception Reaction

In some implementations, a chase vehicle is party of a system including one or more autonomous vehicles. In such implementations, when an autonomous vehicle is attempting or performing a MRC maneuver and a regulatory constraint is not followed, a chase team (e.g., one or more human operators associated with a chase vehicle) could move an autonomous vehicle away within a pre-determined time window. For example, a chase team could move an autonomous vehicle away from an area requiring specific behaviors due to regulatory constraints within ten minutes.

III-C.(c) MRC Regulatory Constraints—Railroad Crossings and Tracks

The system may avoid completing any MRC maneuver on a railroad track. The system may not complete an MRC1 maneuver (e.g., driving to and stopping in a pre-mapped safety area off of the roadway) or MRC3 maneuver (e.g., slowly come to a stop in the lane of current travel) within a first predetermined distance (e.g., 40 feet, 50 feet (15.24 meters), 60 feet) of a railroad crossing or within a second predetermined distance (e.g., 7.5 feet, 8 feet, 8.5 feet (2.59 meters), 9 feet) of the center of a railroad track. When the autonomous driving system or oversight system (e.g., remote control operator) determines that an autonomous vehicle cannot complete an MRC maneuver and accommodate the first or second predetermined distance, the autonomous vehicle may defer commencing a MRC maneuver until safely passing through a railroad crossing. Alternatively, or additionally, an alternate route may be taken, if part of the ODD, that avoids railroad crossings.

III-C.(d) MRC Regulatory Constraints—Tunnels

The system may avoid completing an MRC1 maneuver (e.g., driving to a pre-mapped safety area, stopping in a shoulder or emergency lane) inside of a highway tunnel. A highway tunnel may delay or prevent communication between an autonomous vehicle and an oversight system or control center, as well as between two or more autonomous vehicles, such as vehicles in a fleet that are capable of vehicle-to-vehicle (V2V) communications. Instead, it is preferable that an autonomous vehicle avoid entering a highway tunnel or exit a highway tunnel before attempting to perform a MRC1 maneuver.

III-C.(e) MRC Regulatory Constraints—Exception

The system may obey the regulatory constraints described herein except as necessary to avoid conflict with other traffic or to comply with other regulation or directions from a law enforcement officer (e.g., police officer) or traffic control devices. Directions from law enforcement may include audible instructions, such as to pull over, or hand-gestures, such as to direct traffic around an accident scene or through an intersection with a malfunctioning traffic light.

III-C.(a) MRC Regulatory Constraints—Road Signs

The system may avoid completing an MRC1 maneuver at a location where roadway signs prohibit standing or stopping. The pre-mapped safety areas will be designated in the map describing an area covered by the ODD (operational design domain), and the constraint of designating safety areas every 5 minutes when an autonomous vehicle is moving at or around the speed limit for the area may be relaxed or superseded by the need to prevent the autonomous vehicle from performing a MRC1 maneuver where standing or stopping by a vehicle is prohibited. The areas where standing or stopping a vehicle is prohibited may be identified by a survey vehicle (e.g., a mapping vehicle) or by another autonomous vehicle which is in a fleet with the autonomous vehicle that will perform the MRC1 maneuver. Additionally, or alternatively, the autonomous vehicle may determine that an area prohibits stopping or standing of vehicles by identifying permanent or temporary signs.

III-C.(a) MRC Regulatory Constraints—Emergency Vehicle

While performing an MRC maneuver, the system could yield to an approaching emergency vehicle that has its siren and emergency lights on. In such instances, the autonomous vehicle may bias within its current lane of travel (e.g., move within the boundaries of the lane, off-center toward one side or the other) as required by local regulations, and perhaps in line with the behavior of surrounding traffic. Detection of an emergency vehicle that is actively responding to an emergency situation may be accomplished through use of an audio detection system and the use of one or more video cameras. The audio detection system may be configured to identify the use of sirens, perhaps even to identify the direction of the siren travel relative to the autonomous vehicle. The images from the one or more video cameras may be analyzed to determine that flashing lights are in use and the flashing lights are associated with a vehicle, as opposed to with a traffic light, railroad crossing, building alarm strobe, or the like.

III-C.(a) MRC Regulatory Constraints—Bridges

On controlled access highways, an autonomous vehicle may undergo a MRC1 maneuver on a bridge or other elevated highway structures.

On other roads, such as local roads or surface streets, an autonomous vehicle should not undergo MRC1 maneuvers on a bridge or other elevated structures. In some implementations, the avoidance of safety areas on bridges along roadways that are not controlled access highways may be accomplished by preventing the designation of such areas as safety areas in a map used by an autonomous vehicle. Alternatively, or additionally, an autonomous vehicle may determine, based on the type of roadway it is travelling on, that it will need to complete a MRC1 maneuver before or after a bridge that is detected ahead. The detection of a bridge may be made based on the map (e.g., the high definition map) or based upon signs identifying the bridge or indicating a bridge with a narrowing road width or lack of shoulder area.

In particular, a bridge may be defined as a structure carrying a road or path across a river, ravine, road, railroad, or other obstacle. For example, an overpass may be a type of bridge.

III-C.(a) MRC Regulatory Constraints—Flashing Beacon

The system may avoid completing an MRC1 maneuver within a predetermined threshold distance (e.g., 15 feet, 20 feet, 25 feet, 30 feet) of a flashing beacon or traffic control signal located on the side of the roadway.

III-C.(a) MRC Regulatory Constraints—Intersection

The system may avoid completing an MRC1 or MRC3 maneuver in the middle of an intersection or within a predetermined threshold distance (e.g., 15 feet, 20 feet, 25 feet) of a crosswalk at an intersection.

III-C.(a) MRC Regulatory Constraints—Fire Hydrant

The system may avoid completing an MRC1 maneuver within a predetermined threshold distance (e.g., 15 feet, 20 feet, 25 feet) of a fire hydrant.

III-D. MRC Operational Constraints

The following sections III-D.(a) to III-D.(c) describe example operational constraints that relate to MRC control and maneuvering of an autonomous vehicle.

III-D.(a) MRC Operational Constraints—Operations Center

For non-emergency situations, the operations center may be able to trigger an MRC maneuver. In some example embodiments, the operations center may comprise the oversight system 350 (shown in FIG. 3) and/or a remote computer 400 (shown in FIG. 4).

III-D.(b) MRC Operational Constraints—Driver Takeover

A driver behind the wheel of an autonomous vehicle may be able to cancel an MRC command that is triggered by the autonomous system. In some instances, a safety driver may be present in an autonomous vehicle. In such implementations, the safety driver may receive an audio or visual alert from the autonomous driving system, via speakers or a visual human-machine interface (HMI), indicating the intent of the autonomous vehicle to perform an MRC maneuver. A safety driver may further be made aware of the trigger for the MRC command or maneuver, such as a degradation in one or more subsystem's health, a reduction in functioning in one or more sensor or sensor system, or the detection of the autonomous vehicle approaching a location or scenario that is outside of ODD (operational design domain).

III-D.(c) MRC Operational Constraints—Lost Connection

An autonomous vehicle may issue an MRC command when it detects that it has lost connection to its oversight system (e.g., control center, remote control operator) or chase vehicle for longer than a threshold amount of time.

A chase vehicle may be a vehicle used during testing or in actual missions/journeys which includes equipment to send and receive information to one or more autonomous vehicles within a specific distance from the chase vehicle. A chase vehicle may also carry one or more human operators to review data and issue commands, including MRC commands or changes in route, to one or more autonomous vehicles. Alternatively, or additionally, the one or more human operators in a chase vehicle may be able to operate an autonomous vehicle, for example, when an autonomous vehicle executes and MRC maneuver due to degradation in either communications or the autonomous driving system, a human operator may resume operation of the autonomous vehicle in a manual mode.

A remote control center, or oversight system, may include a remote control operator (RCO) and may be located at a terminal or at a facility that is located distant from the route traversed by the autonomous vehicle.

In either case, whether the autonomous vehicle loses contact with a chase vehicle or a remote control center (e.g., oversight system), once a threshold time has lapsed with loss of contact, the autonomous vehicle may enter an MRC state or initiate an MRC maneuver. The threshold time may depend on the speed of the autonomous vehicle and the distance between the autonomous vehicle and surrounding objects, including NPC vehicles. In some instances, the threshold time may be equal to the time to collision (TTC) for the autonomous vehicle. The threshold time for loss of contact may be a fixed time.

III-E. MRC Environmental Constraints

The following section III-E.(a) describes an example environmental constraint that relates to MRC control and maneuvering of an autonomous vehicle.

III-E.(a) MRC Environmental Constraints—MRC1 Escalation

When the autonomous driving system of an autonomous vehicle issues an MRC1 command, one or more human operators (e.g., the operators of a chase vehicle, a remote control operator associated with an oversight system or control center) may be able to escalate the MRC command to an MRC3 or MRC2 as they see fit due to the external environment (e.g., traffic conditions, upcoming accidents, etc.).

III-F. MRC Functional Safety (FUSA) Compliant Behavior

The following sections III-F.(a) to III-F.(e) describe example functional safety (FUSA) guidelines that relate to MRC control and maneuvering of an autonomous vehicle.

III-F.(a) Transfer to Safe State: System Degradation

The autonomous driving system may transfer resources to a safe state when significant hardware, hardware software interface (HSI), or software resources have been made unavailable.

III-F.(b) Transfer to Safe State: Parking Out of Traffic

The autonomous driving system may securely park off of the highway when there is continued degradation of various systems of the autonomous vehicle, yet enough resources and time are available to make it to the parking location (e.g., pre-mapped safety area).

III-F.(c) Transfer to Safe State: Continued Operation in Traffic

The system may slow down and increase following distance when there are not enough computing resources available to handle all of the processes executed by the autonomous driving system. This will enable the autonomous driving system to operate safely, allowing for greater time to determine the status of the environment surrounding the autonomous vehicle, to predict the actions or path to be taken by the autonomous vehicle or NPC vehicles (non-player character vehicles, e.g., surrounding vehicles which are not controlled by the autonomous vehicle's autonomous driving system), and sufficient time to contact and receive instructions from an oversight or command center, if needed.

In some implementations, the autonomous vehicle may preferably move to the lane which is considered the slow lane for through traffic in the current area of travel. For example, in the United States, in most cases the slow lane is the right-most lane that is not an exit-only lane. After successfully transitioning into the slow lane, the autonomous vehicle may reduce its speed to the legally acceptable slowest moving speed (e.g., 45 miles per hour when traffic is free flowing) and may increase the distance between itself and neighboring vehicles by a safety factor (e.g., by a factor of 1.5, a factor of 2, a factor of 2.5).

III-F.(d) Transfer to Safe State: Recording Events During Degraded Operation

The autonomous driving system may create logs for degradation analysis when the hardware or hardware software interface (HSI) has lost resources but is otherwise available to process the volume of algorithms. These logs may be recorded using the same hardware and software modules used to log normal operational data from the autonomous vehicle. Alternatively, or additionally, the autonomous vehicle may be equipped with a dedicated logging system which records data from the autonomous vehicle starting a predetermined amount of time before the triggering of a MRC maneuver until the competition of the MRC maneuver. The predetermined amount of time before the triggering of the MRC maneuver may be 1 minute, 2 minutes, 5 minutes, or 10 minutes, for example.

III-F.(e) Transfer to Safe State: Immediate Stop

The system may safely execute an emergency stop when the autonomous driving system is crashing, and a safe stop is needed immediately. In some implementations, when the autonomous driving system is determined to be crashing, the controls systems of the autonomous vehicle may use the last best data to select a trajectory and deceleration to accomplish the safe stop. The last best data may be trajectory data (e.g., planning data) that is generated by the autonomous driving system (e.g., by a planning module) for the current moment and for a time period up to 10 minutes ahead of the current moment. The last best data may be updated every minute or more or less frequently, depending on the configuration of the autonomous driving system.

III-E. MRC Test Mode

The following sections III-G.(a) to III-G.(b) describe example test mode guidelines that relate to MRC control and maneuvering of an autonomous vehicle.

III-G.(a) MRC Test Mode

The system provides an MRC testing functionality, which allows a test operations user to test MRC modes 1, 2, and 3. The MRC testing functionality may include one or more computing modules capable of providing the autonomous driving system with simulated data, including simulated sensor data, indicating a fault of one or more systems. The MRC testing functionality may also include one or more computing modules which record, display, or otherwise capture the response of the autonomous driving system to the simulated sensor data. Optionally, or additionally, the MRC testing functionality may include a facility capable of sending an MRC command from a remote source to an autonomous driving system. The facility capable of sending an MRC command may include an oversight system or remote control center that includes signal transmission equipment; a separate testing vehicle, such as a chase vehicle, with a transceiver; and the like. The facility capable of sending an MRC command may also be capable of receiving information regarding to the compliance of an autonomous driving system with the issued MRC command in some implementations.

III-G.(b) MRC Test Mode Safeguards

The system may provide safeguards to limit unintended activation of MRC Test Mode, including a default setting on startup that MRC Test Modes are completely disabled and a user interface that does not allow false activation of MRC test modes. In some embodiments, the user interface may be in a display/monitor associated with the VCU in the autonomous vehicle. In some embodiments, the user interface may be associated with a monitor of the remote computer 400.

IV. Road Debris and Unknown Objects

An autonomous vehicle may detect and respond to unknown objects in a way that allows for the safety of the vehicle, as well as for the safety of surround vehicles, objects, and people. Sensor data may identify items in the roadway, and one or more data processing modules for each sensor type may identify any of: roadway markings, roadway signs, signal lights, vehicles, pedestrians, common roadside objects, shadows, warning cones, flares, damaged roadway, and the like. When an object obstructs the roadway, or may impede the path of an autonomous vehicle, and its on-board sensors and corresponding analysis modules are unable to determine whether or not it is safe to drive over the unknown object, the autonomous vehicle may perform an MRC maneuver or re-route to go around the unknown object. In various embodiments, the presence of road debris or unknown objects on a roadway may be a fault condition whose occurrence is determined via sensor data received by a computer located in the autonomous vehicle (e.g., VCU 150). For example, if the sensor data is an image provided by a camera on the autonomous vehicle, the compliance module of the VCU can determine an occurrence of a fault condition upon detecting a presence of road debris or unknown objects on the roadway in the image. In various embodiments, the presence of road debris or unknown objects may be a fault condition that is monitored along with the fault conditions and MRC triggers described in section III-B. In various embodiments, the presence of road debris is an MRC trigger/fault condition. Alternatively, or additionally, the autonomous vehicle may send data corresponding to an unknown object to an oversight system or control center where a human operator may attempt to identify the obstructing object and then send instructions for how to proceed back to the autonomous vehicle.

IV.(a) Detection of Unknown Objects

An autonomous vehicle may be able to detect objects that are taller than a threshold height (e.g., 10 cm (3.94 in.)) from at least a threshold distance (e.g., 80 meters) on the autonomous vehicle's projected path of travel and on any lane or shoulder adjacent to the autonomous vehicle's path. Unless the detected objects are otherwise classified, the detected objects may be classified as "unknown objects". The threshold distance may increase with the height of the object, for example and object that is 15 cm (5.91 inches) tall may be detected from a distance of at least 110 meters ahead of the autonomous vehicle.

IV.(b) Damage to Autonomous Vehicle

If an autonomous vehicle is damaged by an obstacle, the autonomous vehicle may perform an MRC maneuver or process according to a pre-mapped safety area. The damaged autonomous vehicle may perform a partial shutdown of systems to prevent further damage to the vehicle or surroundings. Once stopped, the damaged vehicle may remain stationary until support or towing services arrive.

IV.(c) Static Objects—Speed Reduction

When contact with static obstacles cannot be avoided, an autonomous vehicle may further reduce its speed and maintain stability as contact is made with the obstacle. When the autonomous vehicle is a tractor-trailer, maintenance of stability may include avoiding a roll-over of jackknifing of the vehicle or trailer.

IV.(d) Moving Unknown Objects—Avoid Contact

An autonomous vehicle may avoid coming into contact with any moving unknown objects, excluding flying debris. This may enable the autonomous vehicle to avoid collision with animals or smaller vehicles of indeterminate type in the roadway. An unknown object may be an object which the autonomous driving system cannot identify, such as an object it has not previously encountered or does not have knowledge of.

IV.(e) Static Objects—Obstacle Avoidance

On detection of a tire tread or static unknown object, an autonomous vehicle could reduce its speed and/or lane bias, straddle the detected tire tread or static unknown object, or change lanes in order to avoid contact with the detected tire tread or static unknown object.

In general, straddling an object may refer to driving on both sides of the object such that the object passes through between the left tires and the right tires of the autonomous vehicle.

In various embodiments, road debris or unknown object detected by a compliance module of the VCU can be classified by the compliance module as static or in motion. The autonomous vehicle may operate in accordance with a maneuver (e.g., reducing speed and/or lane bias, straddling, changing lanes, etc.) based on the classified road debris or unknown object. In various embodiments, driving operation module may not cause the autonomous vehicle to operate in accordance with a straddling maneuver if the detected road debris or unknown object is classified as being in motion. In various embodiments, the classification of road debris or unknown objects as static or in motion may be performed by the compliance module based on determining a velocity of the detected road debris or unknown object (e.g., via sensor data collected over time) and comparing the determined velocity to a pre-determined threshold. For example, if the determined velocity of the detected road debris or unknown object exceeds the pre-determined threshold, the detected road debris or unknown object may be classified as in motion, whereas if the determined velocity is less than or equal to the pre-determined threshold, the detected road debris or unknown object may be classified as static.

IV.(f) Detection of Tire Treads

An autonomous vehicle may be able to detect and classify tire treads (e.g., debris from a tire that has separated from a NPC vehicle, broken pieces of a burst tire) on a roadway that are taller than a threshold height (e.g., 15 cm (5.91 in.)) or longer than a threshold length (e.g., 30 cm (11.8 in.)) from at least a threshold distance away (e.g., at least 110 meters ahead) on the autonomous vehicle's projected path of travel and on any lane or shoulder adjacent to the autonomous vehicle's path.

IV.(g) Map Update for Road Debris

On detection of road debris or an unknown object, a map may be updated in real-time to reflect the location of the object. For example, an autonomous vehicle (and various sub-systems) may communicate data describing the detected debris or objects to a system (e.g., the oversight system 350, a third-party system) configured to update, generate, and/or manage digital maps used for navigation for the autonomous vehicle. In another example, the autonomous vehicle may include a mapping module, a navigation subsystem, and/or the like that may update a map in real-time based on detection of road debris or an unknown object.

IV.(h) Notify Oversight

An autonomous vehicle may notify the oversight system 350 whenever the autonomous vehicle takes action as a direct result of road debris or unknown objects. The notification may be made directly to the oversight system or to one or more other autonomous vehicles in a fleet which in turn may pass along the information to the oversight system.

IV.(i) Partial Lane Change for Obstacle Avoidance

An autonomous vehicle could partially change lanes for obstacle avoidance only when doing so would not result in a collision and when biasing within the lane, straddling within the lane, and fully changing lanes are not feasible options. In some examples, the autonomous vehicle may optionally use an extended drive-able area (e.g., a road shoulder, a gore) if necessary.

IV.(j) Detection of Road Hazards by Survey Vehicle

Some example systems, such as the system 300 shown in FIG. 3, may include one or more survey vehicles, mapping vehicles, and/or the like that may collect data (e.g., real-time traffic data, road condition/environmental data, mapping data) used in the operation of the one or more autonomous vehicles 105. In systems with a survey/mapping vehicle, the survey/mapping vehicle may identify static debris (including tire treads) and Out-of-ODD (operational design domain) road hazards that are within the non-shoulder lanes of the roadway and may alert one or more chase vehicles, such as an autonomous vehicle, to issue an MRC command. That is, in some examples, an autonomous vehicle may "detect" road hazards via receiving alerts from a survey/mapping vehicle and take action accordingly. Alternatively, or additionally, in systems including a survey/mapping vehicle, situations which may pose a problem to an autonomous vehicle with degradation to its sensor or autonomous driving systems may be identified by the survey/mapping vehicle.

In some implementations, a mapping or survey vehicle may be operated by one or more human operators, or may be operated by a human safety driver utilizing an autonomous driving system. Sensors and sensor systems may be included on the mapping and/or survey vehicles which are similar to those on the autonomous vehicle which will utilize the map information. These sensors may include any of: at least one LIDAR system; at least one radar system; cameras detecting visible light; cameras detecting infrared light; ultrasonic sensor systems; microphone systems, including microphone arrays; at least one inertial measurement unit (IMU); a global positioning system; a satellite positioning system; and the like.

The data compiled by a mapping or a survey vehicle may be used to construct a map that will in turn be utilized by an autonomous vehicle. The map may be a high-definition map with one or more layers of data. The map may be provided as part of the autonomous driving system or computing device on an autonomous vehicle. Updates to the map may be done periodically, such as before start of a mission or journey, or upon completion of a mission or journey during upload or download of data. Updated maps may be pushed to autonomous vehicles over the air periodically or in a timely manner, such as to reflect temporary or permanent changes to the roadway which may not be resolved by the time the autonomous vehicle reaches the change or changes. In some implementations, an autonomous vehicle may collect data indicating such a temporary or permanent change (e.g., road closure, construction zones, sink holes, etc.) and provide that data to an oversight or command center, and that data may in turn be pushed to following autonomous vehicles as an update to the map used by the following vehicles. Alternatively, or additionally, the data may be provided to a following autonomous vehicle within a certain range of the autonomous vehicle directly, but may cause an MRC or change in route by the following vehicle utilizing an existing map instead of updating the map with the data from the leading autonomous vehicle.

IV.(k) Damage Detection

An autonomous vehicle may be able to detect when it experiences significant damage due to an unknown object. Examples of significant damage may include a loss of tire pressure, a loss of fuel pressure, a loss of oil pressure, and/or any other mechanical or electrical deviation from normal operation conditions.

IV.(l) Chase Vehicle—Checking for Damage

Some example systems, such as the system 300 shown in FIG. 3, may include one or more chase vehicles (with respect to an autonomous vehicle). The chase vehicle may travel along the same roadway as the autonomous vehicle at some distance or time behind the autonomous vehicle. In such systems, a chase vehicle may issue an MRC command if the autonomous vehicle makes contact with a road hazard and has not issued the MRC command itself. With this, any potential damage to the autonomous vehicle may be promptly checked. Collision between the autonomous vehicle and a road hazard may be detected by either or both the autonomous vehicle and the chase vehicle. In some implementations, data from sensors on the autonomous vehicle may be transmitted to the chase vehicle and used to make a determination that a collision has occurred. Alternatively, or additionally, sensors on the chase vehicle may provide data that indicates a collision has occurred between the autonomous vehicle and a road hazard. A remote control operator located in the chase vehicle may issue an MRC command when necessary.

IV.(m) Multiple Static Obstacles and Swerving

An autonomous vehicle may avoid swerving back and forth when avoiding multiple static obstacles in its path of travel. If the presence of multiple static obstacles in the autonomous vehicle's path of travel would require the autonomous vehicle to swerve back and forth, the autonomous vehicle could change lanes. In any case, the autonomous vehicle may act to prevent rolling the vehicle or jackknifing (in the case of a tractor-trailer).

IV.(n) Straddle Avoidance

An autonomous vehicle may avoid straddling obstacles that are taller than the ground clearance of the autonomous vehicle's front bumper. In various embodiments, a straddling maneuver may be avoided if an obstacle is classified as being in motion. This will avoid dragging of an object or damage to the underside of the autonomous vehicle.

V. Oversight Features

As described above, an autonomous vehicle may be in communication with an oversight system which may serve various purposes related to the operation of the autonomous vehicle, such as but not limited to monitoring and/or trigger MRC fault conditions.

Figure 4:
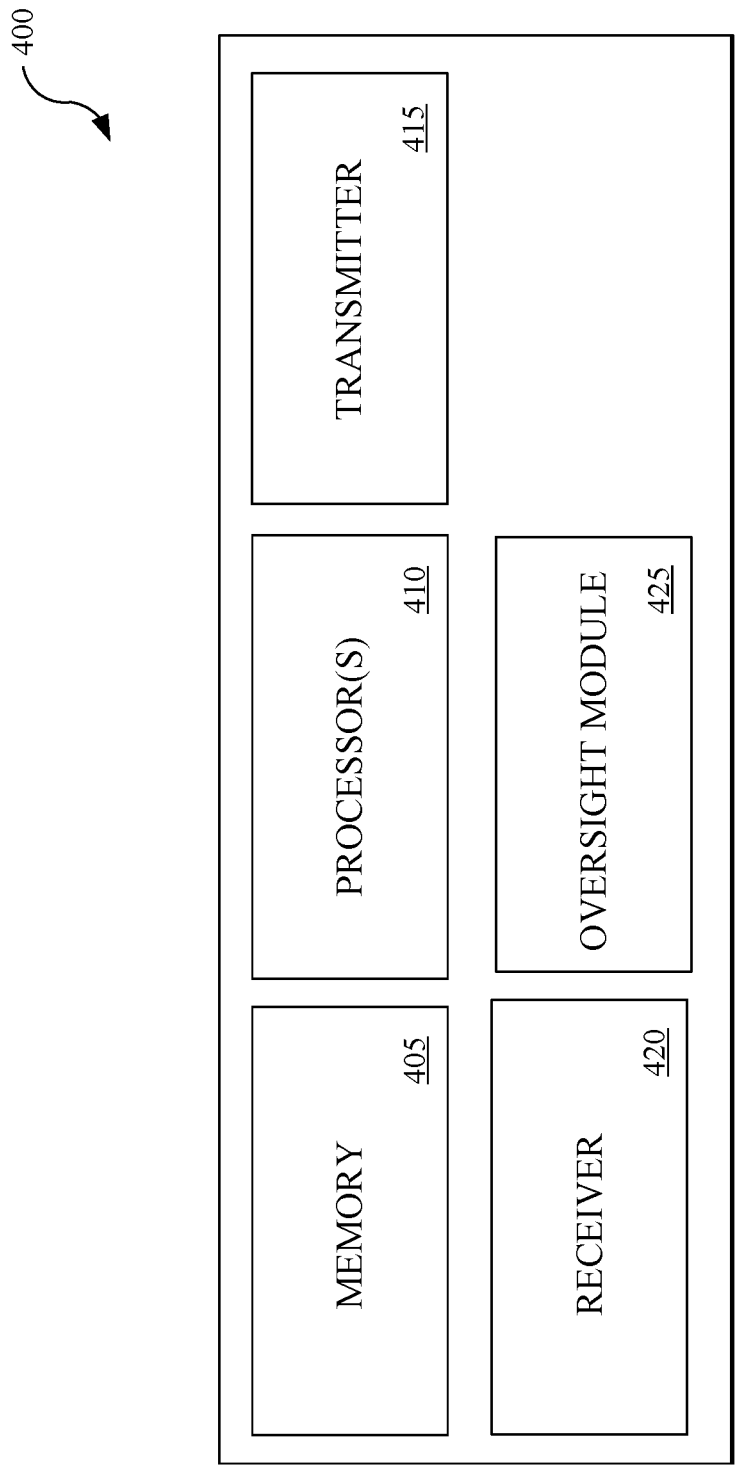
FIG. 4 shows an exemplary block diagram of a remote computer associated with an oversight system.

FIG. 4 shows an exemplary block diagram of a remote computer 400 associated with an oversight system. The oversight system (shown as 350 in FIG. 3) may include the remote computer 400 which can be located at a fixed location outside of an autonomous vehicle. In this patent document, the descriptions related to operations performed by the oversight system can be performed by the oversight module (shown as 425 in FIG. 4) in the remote computer 400. The remote computer 400 includes at least one processor 410 and a memory 405 having instructions stored thereupon. The instructions, upon execution by the processor 410, configure the remote computer 400 to perform the operations related to the oversight module 425, where the oversight module 425 can perform operations related to the oversight system as described at least in FIGS. 1 to 3 and in the various embodiments described in this patent document. A remote computer 400 may include one or more servers.

The transmitter 415 transmits or sends information or data to one or more autonomous vehicles, and the receiver 420 receives information or data from one or more autonomous vehicles.

Table 1 below provides descriptions of a plurality of example features/capabilities of the oversight system and processes performed by the oversight module 425, at least some of which are executed through the communication between the autonomous vehicle and the oversight module 425 of the remote computer 400. For example, the autonomous vehicle and the oversight module 425 may communicate wirelessly (e.g., via the network 370). In general, V2C communication may refer to wireless transmission of data from the autonomous vehicle to the oversight system and/or another remote system (e.g., vehicle-to-cloud), while C2V communication may refer to wireless transmission of data from the oversight system and/or another remote system to the autonomous vehicle (e.g., cloud-to-vehicle).

TABLE 1

| Feature Title | Description |
| --- | --- |
| Real-Time Destination Updates | AV (autonomous vehicle) may be capable of receiving destination updates in real time. |
| Execute Dataflow with Priority (C2V/V2C) | The system may treat the MRC commands with the highest priority compared to other data that may be sent across V2C and C2V. |
| Connectivity Availability (critical) | V2C/C2V communication paths may be available at all times to report location of the Autonomous vehicle and to command MRCs. |
| Connectivity Availability (high) | V2C/C2V communication of alerts may be reliable and sent at the earliest time possible without impacting the critical dataflows. (for example, data that alerts remote operator of a potential problem, or data alerts certain potential out of ODD conditions, data re-routing the vehicle, and etc.). |
| Connectivity Availability (standard) | V2C/C2V communication path may present a minimum of 1 camera feed at any given time when the remote operator initiates the request to view one of the cameras mounted on the AV with the best resolution. Other streamed data is also considered to have standard priority unless specified. For example, remote operator requests data collection of a specific component will also fall under standard transmissions. In various embodiments, the autonomous vehicle (e.g., via the VCU 150) may present a camera feed based on transmitting images or video obtained by the one of the cameras in real-time, or within a pre-determined time (e.g., within 0.1 seconds, within 0.5 seconds, within 1 second, within 2 seconds, within 5 seconds, or the like) from when the camera obtains the images or video. |
| Connectivity Availability (low) (C2V/V2C) | V2C communication about non-time sensitive data for analytics and post processing may be prioritized to be delivered within an hour of the end of a mission. For example, if a mission is 2 hours, the data may be delivered to the cloud no later than 1 hour after the end of the mission. |
| Execute Secure Remote Commands Reliably (C2V/V2C) | Remote operator may execute minimum risk control (MRC) commands and autonomy engagement commands from the cloud to an Autonomous System. Such a command may be reliably executed and may be considered data or communications with critical priority. |
| Feedback of MRC Execution Status (C2V/V2C) | In various embodiments, the system may provide information related to a maneuver for the autonomous vehicle in response to an MRC command received from a remote computer. For example, the system may provide feedback to the remote operator who issued the MRC command. Feedback may include acknowledgement of the MRC command, status until command completion, the identified location for stopping, health of the vehicle, data of the vehicle surroundings/environment which may impact the need to stop, and the like. |
| Remote Monitor of the AV's Location (V2C) | The dataflow architecture may provide reliable and accurate breadcrumb GPS location data (e.g., latitude and longitude coordinates), or a location data trail, to a remote operator from the autonomous vehicle at all times, especially during the AV operation. If storage or forwarding of data is needed, the data sent to the cloud may be sequenced correctly. |
| AV Location Update Rate (V2C) | Location resolution may be configurable and updating of the autonomous vehicle's location may be defaulted to a predetermined value (e.g., 1 second, 2 seconds, 5 seconds). |
| Autonomous vehicle Location Accuracy | GPS accuracy may be less than a threshold distance, a majority of the time, e.g., more than a threshold percentage of the time. |
| Autonomous vehicle Location Ping (C2V) | Remote Operator may have the ability to ping and get real-time location of the Autonomous vehicle. Transmission of this type of data from the autonomous vehicle to an oversight system or control center may be treated with critical priority, such that it takes precedence over standard priority or high priority communications. |
| Remote Monitoring of Autonomous vehicle Readiness (V2C) | System may provide sufficient information about the Autonomous vehicle and AV system roadworthiness from V2C. Transmission of this type of data from the autonomous vehicle to an oversight system or control center may be treated with standard priority. |
| Remote Monitoring of the Mission Status (V2C) | System may provide sufficient information about the mission status and progress from V2C. Mission status may be defined as detailed trip activities. (near real-time). Transmission of this type of data from the autonomous vehicle to an oversight system or control center may be treated with standard priority. |

TABLE 1-continued

| Feature Title | Description |
| --- | --- |
| Reporting of Operating Metrics (V2C) | System may provide operational metrics to inform the remote operator the operational state of the mission. The operation metrics may include: fuel economy, trip miles, safety metrics, AV operational characteristics, and etc.). Transmission of this type of data from the autonomous vehicle to an oversight system or control center may be treated with standard priority. |
| Reporting of Cabin Optics (V2C) | System may provide access status of the cab to the remote operator based on various types of data including systems status data, audio data, and/or video data from inside the cabin of the autonomous vehicle. Example of such optics are: the presence of passengers in the cab; locked status of autonomous vehicle doors; HVAC and ambient temp of the cab; status of a human-machine interface in the autonomous vehicle; and the like. Transmission of this type of data from the autonomous vehicle to an oversight system or control center may be treated with standard priority. |
| Operation Mode (AV/non-AV) (V2C) | The autonomous driving system may indicate to the remote operator the status of the vehicle's operation mode (e.g., AV or non-AV). The system may alert the remote operator when there is a change status from engage to disengage of AV. Transmission of this type of data from the autonomous vehicle to an oversight system or control center may be treated with standard priority. |
| Data Streaming (Compressed) (V2C) | The autonomous driving system may packetize and compress data such as camera feeds from the autonomous vehicle to the cloud to minimize carrier usage fees. This type of data compression and transmission may apply to communications designated standard priority. |
| Set Data Streaming Needs (C2V) | Remote Operator may have the ability to select what type of data to stream, set the time duration for the streaming of the data, and select the best resolution for viewing the streamed data. For example, the Remote Operator may designate quality and duration of streaming camera, LiDAR, or other sensors. |
| Set Alerting Needs (C2V) | Remote Operator may set the rules for alerting and pass the parameters to the autonomous vehicle system. For example, the Remote Operator may set rules up to look for harsh braking, collision avoidance maneuver, accident, autonomous vehicle generated MRCs, route deviation, unauthorized use and etc. |
| Alerting (C2V) | The autonomous driving system may generate alerts and notify the remote operator when the threshold for the alert is triggered. Alerts may be treated with high priority. |
| AV System Updates (C2V) | Remote Operator may perform secure content, parameter updates (wirelessly) to the AV fleet by sending certified/approved update packages to specifically targeted Autonomous vehicle(s). Software updates may be made to vehicle components in addition to the AV System as needed when the autonomous vehicle is at rest. Software updates may be communicated to the autonomous vehicle with high or critical priority. |
| AV System Updates (T2V) | Approved operator(s) may perform secure system or component level updates (tethered) to the AV fleet by sending certified/approved update packages to specifically targeted Autonomous vehicle(s) when the Autonomous vehicle is at a terminal or at rest. Updates may be made to vehicle components in addition to the AV System as needed. |
| Set Logging Data Needs (C2V) | Remote Operator may have the ability to select what type of data to log, set the time duration for the logging of the data, and select the best way to receive the logged data. For example, the Remote Operator may select to log a sensor error message for at least a threshold amount of hours, or for the next threshold number of minutes and upload it when there is local area networking available. This mode of operation may be the usual type of operation (e.g., data with standard priority). |
| Logging Data (V2C) | The autonomous driving system may log specific data based on the remote request and use the best (efficient, cost effective) path to send the logged data to the remote operator. For example, the system may log a sensor error message for a minimum number of hours, or for the next threshold number of milliseconds and upload and send it when the autonomous vehicle reaches a local area network. This mode of operation may be the usual type of operation (e.g., data with standard priority). |
| AV System Health Updates (V2C) | AV system may send health updates to the cloud to inform the remote operator the state of the AV system. Frequency and update rates may be configurable according to priority, and transmissions of this type of data from the autonomous vehicle to an oversight system or control center may be treated with standard to high priority. |

TABLE 1-continued

| Feature Title | Description |
|---|---|
| AV System Health Query (C2V) | Remote operator may have the ability to ask for specific AV system health information. This type of data transmission may be designated high priority. |
| Autonomous vehicle System Health Updates (V2C) | Autonomous vehicle may send health updates to the cloud (e.g., to an oversight system, to a control center) to inform the remote operator the state of the autonomous vehicle for operation. |
| Autonomous vehicle System Heath Query (C2V) | Remote operator may have the ability to ask for specific autonomous vehicle health information. |
| Least Cost Routing/Offloading of Data (V2C) | The autonomous driving system may select the best approach to send/receive large amount of data to and from the Autonomous vehicle to keep costs down. |
| Encrypted Transmission (C2V/V2C) | The autonomous driving system may provide reliable and secured transmission of any data passed between the Autonomous vehicle and the cloud. |
| Entitlement (RBAC) (C2V/V2C) | Remote access to the vehicle may be provided based on the role of the user and which feature the user has access to and the priority of the access. |
| Store and Forward (V2C) | The autonomous driving system may store and forward the data if the communication path is unavailable. |
| Comply to ISO 21434 | V2C and C2V operation must comply to ISO 21434 standards. |
| Download of Autonomy Service Mission | AV may download the autonomy service mission, that is to say the autonomous vehicle may download mission specifics including where it may stop for service (e.g., fueling, routine maintenance, sensor cleaning, weigh stations). |
| Weather-Related A Priori Information | AV may be informed of common weather patterns (e.g. high wind areas) along AV's route. |
| Mission Complete Notification | AV may send mission complete notifications to the OBO (on-board operator, e.g., a driver who parks or docks an autonomous vehicle after arrival at a terminal or yard) and yard operator. |
| Yard Operator Ego Control Takeover | AV may be capable of being taken over by the Yard Operator. |
| Autonomous vehicle Ghosting | The Operator may be alerted when location data (e.g., latitude and longitude coordinates) is no longer reported from the Autonomous vehicle to Oversight for a configurable time period. An alert may be generated to ensure tracking of the Autonomous vehicle. |
| Smart Weather Alerting | The Operator may be alerted when severe weather warning is issued within a predetermined and configurable range of distance ahead of the autonomous vehicle or within a predetermined and configurable radius from the autonomous vehicle. |
| Mission State Changes | The Operator may be notified when a mission changed for a specific Autonomous vehicle that is to be monitored by the oversight system. |
| Departure Changes | The Operator may be alerted when the departure location, logistics and time changes. |
| Inspection State Changes | The Operator may be alerted when: inspection time runs long, inspection failed, inspection can't be completed, and/or inspection is completed. |
| Exceeding GVW | The Operator may be alerted if the autonomous vehicle exceeds the gross vehicle weight allowed by regulations, and additionally, or alternatively, when there is a significant increase in the weight of the autonomous vehicle while on its route as compared to at the beginning of a route. |
| MRC Initiated | The Operator may be alerted when certain set MRC condition is met. For example, the operator may be alerted when the autonomous vehicle triggers MRC2. |
| AV vs Manual Mode | The Operator may be alerted when there is a change from AV to manual mode or vice versa during operation. |
| Stream MRC Activities | When any MRCs are triggered, enable camera view and auto launch it for the user so he/she can watch the MRC activities from start to completion. In various embodiments, enabling camera view includes providing a camera feed or stream to a remote computer associated with the user. Specifically, an image or a video obtained by a camera on the autonomous vehicle may be transmitted to the remote computer in real-time, or within a pre-determined time (e.g., within 0.1 seconds, within 0.5 seconds, within 1 second, within 2 seconds, within 5 seconds, or the like) from when the camera obtains the images or video. |
| Add Search Feature | Operator may be able to perform advanced search to look for Autonomous vehicle and System info easily from the web app interface. |
| Track Usage and Clicks/Reporting | The Oversight system may track user metrics so that the frequency of visit to various pages can be measured (e.g., for UI/UX improvement analysis). |
| Workflow Highlights | The system may highlight workflow progress in the entire operation more prominently. Clicking a progress bar presented in a user interface may provide more details, such as details about the health of the autonomous vehicle, estimated time to arrival, ultimate destination of the autonomous vehicle, and the like. |

TABLE 1-continued

| Feature Title | Description |
| --- | --- |
| Roadside Assistance Integration | Oversight may be integrated to a 3rd party roadside assistance solution so that support can be automatically dispatched, and the event can be managed until closure. |
| Show Vehicle Mission Schedule | System may display the autonomous vehicle's scheduled missions and scheduled preventative maintenance time. |
| Pre-Trip Inspection | Prior to mission launch, the autonomous vehicle may undergo rigorous inspection. |
| Real-Time Destination Updates | AV may be capable of receiving destination updates in real time. |
| Autonomous vehicle Location Update Rate (V2C) | Location resolution may be configurable, and update may be defaulted to a predetermined number of seconds (e.g., 1 second, 2 seconds). |
| Reporting of Operating Metrics (V2C) | The autonomous driving system may provide operational metrics to inform the remote operator the operational state of the mission. The operation metrics may include: fuel economy, trip miles, safety metrics, AV operational characteristics, and etc.). This data may be communicated with standard priority. |
| AV System Updates (C2V) | Remote operator may perform secure content, parameter updates (wirelessly) to the AV fleet by sending certified/approved update packages to specifically targeted Autonomous vehicle(s). Software updates may be made to autonomous vehicle components in addition to the AV System as needed when the autonomous vehicle is at rest. |
| AV System Updates (T2V) | Approved operator(s) may perform secure system or component level updates (tethered) to the AV fleet by sending certified/approved update packages to specifically targeted Autonomous vehicle(s) when the Autonomous vehicle is at a terminal or at rest. Updates may be made to vehicle components in addition to the AV System as needed. |
| AV System Health Query (C2V) | Remote operator may have the ability to ask for specific AV system health information. This type of activity may be considered high priority and so the data transfers for these activities may take priority over routine data exchange. |
| Autonomous vehicle System Health Updates (V2C) | Autonomous vehicle may send health updates to the cloud to inform the remote operator the state of the autonomous vehicle for operation. |
| Download of Autonomy Service Mission | AV may download the autonomy service mission. |
| Weather-Related A Priori Information | AV may be informed of common weather patterns (e.g. high wind areas) along AV's route. |
| Mission Complete Notification | AV may send mission complete notifications to the OBO and yard operator. |
| Mission State Changes | The Operator may be notified when a mission changed for a specific Autonomous vehicle that is supposed to be monitored. |
| Roadside Assistance Integration | The oversight system may be integrated to a 3rd party roadside assistance solution so that support can be automatically dispatched and the event requiring roadside assistance can be managed until closure. |
| Show Vehicle Mission Schedule | System may display the autonomous vehicle's scheduled missions and scheduled preventative maintenance time. |

Figure 6:
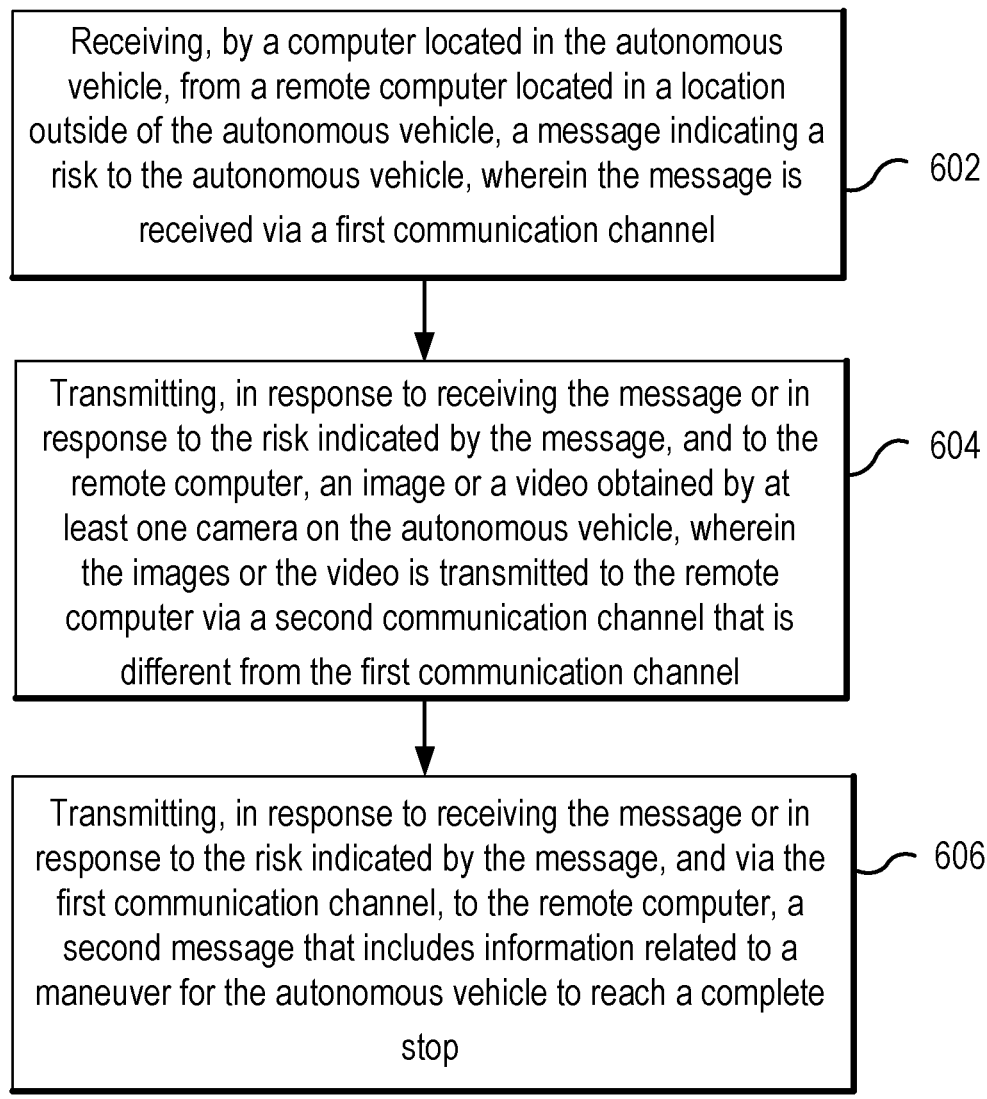
FIG. 6 shows an example flowchart of an autonomous driving operation performed by a vehicle to communicate with an oversight system.

FIG. 6 shows an example flowchart of an autonomous driving operation performed by a vehicle configured to communicate with an oversight system. Operation 602 includes receiving, by a computer located in the autonomous vehicle, from a remote computer located in a location outside of the autonomous vehicle, a message indicating a risk to the autonomous vehicle, wherein the message is received via a first communication channel. Operation 604 includes transmitting, in response to receiving the message or in response to the risk indicated by the message, and to the remote computer, an image or a video obtained by at least one camera on the autonomous vehicle, wherein the images or the video is transmitted to the remote computer via a second communication channel that is different from the first communication channel. Operation 606 includes transmitting, in response to receiving the message or in response to the risk indicated by the message and via the first communication channel, to the remote computer, a second message that includes information related to a maneuver for the autonomous vehicle to reach a complete stop.

In some embodiments, the autonomous driving operation further includes causing, in response to the receiving the message or in response to the risk indicated by the message and by the computer, the autonomous vehicle to operate in accordance with the maneuver by sending instructions to one or more devices in the autonomous vehicle, wherein the maneuver is configured to bring the autonomous vehicle to the complete stop. In some embodiments, the maneuver includes driving related information that when followed causes the autonomous vehicle to perform the complete stop at an area that is located off of a lane in which the autonomous vehicle is operating on the roadway. In some embodiments, the maneuver includes driving related information that when followed causes the autonomous vehicle to perform the complete stop at a deceleration greater than a pre-determined threshold and in a lane in which the autonomous vehicle is operating on the roadway in which the autonomous vehicle is operating. In some embodiments, the maneuver includes driving related information that when followed causes the autonomous vehicle to perform the complete stop at a deceleration less than or equal to a pre-determined threshold and in a lane in which the autonomous vehicle is operating on the roadway in which the autonomous vehicle is operating.

In some embodiments, the image or the video are transmitted in real-time as the image or the video are being obtained by the at least one camera. In some embodiments, the image or the video are transmitted within a predetermined amount of time from when the image or the video were obtained by the at least one camera. In some embodiments, the image or the video are transmitted after a predetermined amount of time from when the image or the video were obtained by the at least one camera. In some embodiments, the message identifies the at least one camera to obtain the image or the video. In some embodiments, the message identifies a sensor from which the image or the video is obtained.

In some embodiments, the autonomous driving operation further includes causing the autonomous vehicle to operate in accordance with the maneuver by sending instructions to one or more devices in the autonomous vehicle.

In some embodiments, the autonomous driving operation further includes periodically transmitting, to the remote computer, a location of the autonomous vehicle via the first communication channel. In some embodiments, the autonomous driving operation further includes transmitting, to the remote computer in response to receiving a request from the remote computer for a location of the autonomous vehicle, the location of the autonomous vehicle via the first communication channel. In some embodiments, the request from the remote computer is received via the first communication channel. In some embodiments, the request from the remote computer is received via the second communication channel.

In some embodiments, the autonomous driving operation further includes transmitting, to the remote computer, an indication that the autonomous vehicle has reached the complete stop. In some embodiments, the autonomous driving operation further includes transmitting, to the remote computer and via the first communication channel, an indication that the autonomous vehicle has reached the complete stop. In some embodiments, the autonomous driving operation further includes transmitting, to the remote computer and via the second communication channel, an indication that the autonomous vehicle has reached the complete stop VI. Curved Roads and/or General Curves An autonomous vehicle (e.g., an autonomous truck) may be able to navigate curved highway roads safely. This navigation includes having the ability to detect that a portion of a highway or roadway is curved. Various types of data, including mapping, navigational, and perception data (e.g., images, radar data, LiDAR data), may be used to identify a curved stretch of road. Once a curved portion of the roadway or highway is identified, an autonomous vehicle (e.g., autonomous truck) can be controlled to maneuver appropriately. The autonomous vehicle may be controlled to stay within the boundaries of its current lane, make appropriate speed and steering adjustments to keep in its lane. The autonomous vehicle control systems can alter the positioning of the autonomous vehicle within its lane, that is to say adjust lane biasing, in light of surrounding vehicles or objects, as will be described in greater detail below. There can also be a threshold amount that the autonomous vehicle, or truck, may be allowed to move to accommodate surrounding vehicles and the curve in the roadway. If this threshold amount would be exceeded, the autonomous vehicle can perform an alternative maneuver, such as slowing, temporarily moving off the roadway, or rerouting, to travel safely.

VII. Emergency Lane Vehicle on Highway or Road

An autonomous vehicle (e.g., an autonomous truck) may be able to maneuver appropriately when encountering one or more vehicles in an emergency lane on a roadway that the vehicle is traversing. This feature includes the ability to identify that there is at least one vehicle in the emergency lane (e.g., shoulder lane). The ability to identify the presence of a vehicle in the emergency lane includes identifying an emergency lane, identifying the type of vehicle in the emergency lane, and identifying the possibility that a vehicle will enter traffic or leave traffic for the emergency lane, as well as identifying the location of the one or more vehicles in the emergency lane.

Behaving appropriately for any vehicle on a freeway passing a vehicle in a shoulder or emergency lane may depend on many factors, including any one or more of: the surrounding traffic, the desired trajectory of the moving vehicle, the presence or approach of emergency responders or law enforcement, the presence of pedestrians adjacent to the pulled-over vehicle, road debris, and/or local regulations.

After detecting the presence of one or more vehicles stopped in the shoulder or emergency lane, an autonomous truck may do any of the following, as deemed appropriate: slow in the current lane; move over in the current lane to accommodate the stopped vehicle(s); move over in the current lane to accommodate other vehicles moving to avoid the stopped vehicle(s), change lanes to create more distance between the autonomous vehicle and the stopped vehicle(s); and exit the roadway.

In some embodiments, when slowing with an emergency vehicle detected in a shoulder or emergency lane adjacent to the autonomous vehicle, the autonomous vehicle may slow down by a predetermined amount when the posted speed limit is 25 mph or more (e.g., at least 20 mph when the posted speed limit is 25 mph or more). Alternatively, if the posted speed limit is less than 25 mph, an autonomous vehicle traveling in a lane adjacent to an emergency lane in which an emergency vehicle is stopped may slow down to 5 mph.

In some instances, an emergency vehicle or other vehicle that is stopped in a shoulder or emergency vehicle may begin to move into the main lanes of traffic. The autonomous vehicle can accommodate the emergency vehicle by adjusting its speed or executing other accommodating maneuvers. This process of accommodating one or more vehicle moving from a shoulder to a main lane of traffic can include considerations of local regulations and calculations of which maneuver is safest and most feasible to execute, as well as identifying that a vehicle in a shoulder wants to enter traffic. Conversely, it may be necessary accommodate an emergency or other vehicle that needs to enter a shoulder or emergency lane. Part of such an accommodation by an autonomous vehicle is the identification of a vehicle that wants to move to a shoulder, as well as considering local regulations and general safety to move in such a way to allow the other vehicle to reach the shoulder, assuming the other vehicle has sufficient power to do so.

VIII. Lane Bias

An autonomous vehicle may be able to bias its location in the lane properly. A technique for biasing the autonomous vehicle may include moving the autonomous vehicle from center of a lane closer to a right or left edge of the lane in which the autonomous vehicle is travelling. A technical benefit of lane bias related operations is that it can improve safety or comply with applicable regulations where the autonomous vehicle may need to move from the center of the lane.

Appropriate utilization and execution of lane bias related techniques by an autonomous vehicle may be performed by the compliance module (shown as 166 in FIG. 1) and may include: identification of an opportunity to bias in-lane; definitions of lane biasing based on applicable regulations; identification and abiding by maximum allowable biasing in-lane; identification of bias timing, including when to start and when to stop biasing; identification of bias triggering conditions, such as the presence of a vehicle or encroaching object located predominately in an adjacent lane; and/or the like.

IX. Lane Change

An autonomous vehicle may be able to properly change lanes on a highway or roadway. Techniques for performing lane change may include at least the following: the identification of spaces (e.g., windows) in adjacent lanes into which the autonomous vehicles can move into; monitoring of the vehicles in the lane into which the autonomous vehicle wants to move; identifying conditions in which a lane change should be aborted; making sure that lane change and aborted lane changes can be executed smoothly; and how to avoid collisions when changing lanes.

X. Merging onto Highway

An autonomous vehicle may properly merge into lanes on highways from on-ramps or utilize k-ramps as appropriate. Executing a merge onto a highway may include the ability to identify a gap in traffic allowing for the merge by the autonomous vehicle, as well as the ability to identify when the vehicle should commence a merge and complete a merge to be in accordance with applicable regulations.

XI. Parallel Large Vehicles and Objects

An autonomous vehicle may behave appropriately when approaching, being approached, or driving in parallel to a large vehicle. Encompassed in this appropriate behavior is the ability to determine that another vehicle is indeed driving or may soon be driving parallel to the autonomous vehicle, as well as the risk associated with the situation if and when the other vehicle is parallel to the moving autonomous vehicle. The appropriate behavior executed by the autonomous vehicle can be determined on the assessed risk, which can be influenced by the duration of parallel driving, the overall speed of the autonomous vehicle and surrounding traffic, as well as the desired route or trajectory of the autonomous vehicle. Appropriate behavior may include biasing in the current lane, changing lanes, slowing down, and/or the like.

XII. Pedestrian and/or Cyclist Interaction

An autonomous vehicle may identify, classify, and properly interact with pedestrians and cyclists. Each jurisdiction (e.g., state, country) may have its own regulations to be followed with any vehicle is operating around pedestrians and/or cyclists. Some of the regulations are high-level, such as avoidance of encroaching on cross-walks or bicycle lanes. Other regulations are more granular and depend on the relative position of the trajectories of the pedestrian or cyclist as well as the vehicle. For example, when a vehicle is turning from one road to another, and there is a dedicated lane for such a turn, the regulations may dictate how to interact with a cyclist in a bicycle lane or path that is adjacent to the turning lane. In order for an autonomous vehicle to operate properly, in accordance with applicable regulations, the compliance module (shown as 166 in FIG. 1) of the autonomous vehicle can determine which regulation(s) to apply based upon location and the type of interaction. In some embodiments, the compliance module can not only determine where the autonomous vehicle is located (e.g., based on location provided by a GPS device on the autonomous vehicle), but it can also identify a pedestrian and/or cyclist and can track the motions of the pedestrian/cyclist in relation to the roadway and lanes or specialized surrounding areas (e.g., cross-walk, sidewalk, bike lane).

XIII. Turn Signals

An autonomous vehicle may properly use turn signals to safely traverse a route. Proper use of a turn signal may require recognition of any applicable regulations and acting in accordance with those regulations. Proper use of turn signals can also include recognizing that a turn is coming up in the autonomous vehicle's trajectory and activating and terminating the signaling in a way that effectively alerts surrounding drivers and vehicles. More complicated maneuvers or combinations of maneuvers may require more detailed sub-features or tasks for execution or fulfillment of this features. Proper use of turn signals may also include a recognition of when not to use a turn signal or when to terminate a turn signal. For example, when a lane change or turn is no longer desired, a turn signal may be terminated. Alternatively, or additionally, when an autonomous vehicle wants to preclude a following vehicle from entering a gap into which the vehicle intends to merge, early initiation of the turning signal may be prohibited.

In order to perform the above features, an autonomous vehicle may utilize any of the sensors, particularly the data obtained from the sensors, in conjunction with the computing facilities on-board the autonomous vehicle, such as those associated with or in communication with the VCU. Alternatively, or additionally, the above features may be executed by an autonomous vehicle with aid from an oversight system, or control center, and optionally with aid from a human remote control operator. The oversight system, and in some cases the remote control operator, may communicate environmental data, map updates, instructions, or other information to an autonomous vehicle. An on-board map, such as a high-definition map, may be used by an autonomous vehicle to accomplish some of the features described herein, particularly when knowledge of location and local regulations (e.g., speed limits, obligations under the law, traffic conventions, intersection types) is needed to complete a task described in the feature.

While this document refers to an autonomous truck, it should be understood that any autonomous ground vehicle may have such features. Autonomous vehicles which traverse over the ground may include: semis, tractor-trailers, 18 wheelers, lorries, class 8 vehicles, passenger vehicles, transport vans, cargo vans, recreational vehicles, golf carts, transport carts, and the like.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Implementations of the subject matter and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of characteristics that may be specific to particular embodiments or sections of particular inventions. Certain characteristics that are described in this patent document in the context of separate embodiments or sections can also be implemented in combination in a single embodiment or a single section. Conversely, various characteristics that are described in the context of a single embodiment or single section can also be implemented in multiple embodiments or multiple sections separately or in any suitable sub combination. A feature or operation described in one embodiment or one section can be combined with another feature or another operation from another embodiment or another section in any reasonable manner. Moreover, although characteristics may be described above as acting in certain combinations and even initially claimed as such, one or more characteristics from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of operating an autonomous vehicle, comprising:
receiving, by a computer located in the autonomous vehicle, from a remote computer located in a location outside of the autonomous vehicle, a message indicating a risk to the autonomous vehicle;
in response to receiving the message or in response to the risk indicated by the message:
transmitting, to the remote computer, an image or a video obtained by at least one camera on the autonomous vehicle;
transmitting, to the remote computer, a second message that includes information related to a first MRC maneuver for the autonomous vehicle to reach a complete stop; and
causing, by the computer, the autonomous vehicle to operate in accordance with the first MRC maneuver by sending instructions to one or more devices in the autonomous vehicle, wherein the first MRC maneuver includes driving related information that when followed causes the autonomous vehicle to perform the complete stop at a first deceleration at a first area; and in response to a determination that the autonomous vehicle has been operating in accordance with the first MRC maneuver for a time longer than a pre-determined time threshold or for a distance greater than a pre-determined distance threshold, causing, by the computer, the autonomous vehicle to switch from the first MRC maneuver to a second MRC maneuver to operate in accordance with the second MRC maneuver, wherein the second MRC maneuver includes driving related information that when followed causes the autonomous vehicle to perform the complete stop at a second deceleration different from the first deceleration at a second area different from the first area.

2. The method of claim 1, wherein the image or the video are transmitted in real-time as the image or the video are being obtained by the at least one camera.

3. The method of claim 1, further comprising:
causing the autonomous vehicle to operate in accordance with the maneuver by sending instructions to one or more devices in the autonomous vehicle.

4. The method of claim 1, further comprising:
periodically transmitting, to the remote computer, a location of the autonomous vehicle.

5. The method of claim 1, wherein the message identifies the at least one camera to obtain the image or the video.

6. The method of claim 1, further comprising transmitting, to the remote computer, an indication that the autonomous vehicle has reached the complete stop.

7. A system for operating an autonomous vehicle, comprising a computer that includes at least one processor and a memory storing instructions that, when executed by the at least one processor, cause the system to:
receive, from a remote computer located in a location outside of the autonomous vehicle, a message indicating a risk to the autonomous vehicle;
in response to receiving the message or in response to the risk indicated by the message:
transmit, to the remote computer, an image or a video obtained by at least one camera on the autonomous vehicle;
transmit, to the remote computer, a second message that includes information related to a first MRC maneuver for the autonomous vehicle to reach a complete stop; and
cause the autonomous vehicle to operate in accordance with the first MRC maneuver by sending instructions to one or more devices in the autonomous vehicle, wherein the first MRC maneuver includes driving related information that when followed causes the autonomous vehicle to perform the complete stop at a first deceleration at a first area; and
in response to a determination that the autonomous vehicle has been operating in accordance with the first MRC maneuver for a time longer than a pre-determined time threshold or for a distance greater than a pre-determined distance threshold, cause, by the computer, the autonomous vehicle to switch from the first MRC maneuver to a second MRC maneuver to operate in accordance with the second MRC maneuver, wherein the second MRC maneuver includes driving related information that when followed causes the autonomous vehicle to perform the complete stop at a second deceleration different from the firt deceleration at a second area different from the first area.

8. The system of claim 7, wherein the image or the video are transmitted within a predetermined amount of time from when the image or the video were obtained by the at least one camera.

9. The system of claim 7, wherein the message identifies a sensor from which the image or the video is obtained.

10. The system of claim 7, wherein the at least one processor is further configured to cause the system to:
transmitting, to the remote computer in response to receiving a request from the remote computer for a location of the autonomous vehicle, the location of the autonomous vehicle.

11. The system of claim 10, wherein the request from the remote computer is received.

12. The system of claim 7, wherein the at least one processor is further configured to cause the system to:
transmit, to the remote computer, an indication that the autonomous vehicle has reached the complete stop.

13. A non-transitory computer readable program storage medium having code stored thereon, the code, when executed by at least one processor, causing the at least one processor to:
receive, from a remote computer located in a location outside of the autonomous vehicle, a message indicating a risk to the autonomous vehicle;
in response to receiving the message or in response to the risk indicated by the message:
transmit, to the remote computer, an image or a video obtained by at least one camera on the autonomous vehicle;
transmit, to the remote computer, a second message that includes information related to a first MRC maneuver for the autonomous vehicle to reach a complete stop; and
cause the autonomous vehicle to operate in accordance with the first MRC maneuver by sending instructions to one or more devices in the autonomous vehicle, wherein the first MRC maneuver includes driving related information that when followed causes the autonomous vehicle to perform the complete stop at a first deceleration at a first area; and
in response to a determination that the autonomous vehicle has been operating in accordance with the first MRC maneuver for a time longer than a pre-determined time threshold or for a distance greater than a pre-determined distance threshold, cause, by the computer, the autonomous vehicle to switch from the first MRC maneuver to a second MRC maneuver to operate in accordance with the second MRC maneuver, wherein the second MRC maneuver includes driving related information that when followed causes the autonomous vehicle to perform the complete stop at a second deceleration different from the first deceleration at a second area different from the first area.

14. The non-transitory computer readable program storage medium of claim 13, wherein the image or the video are transmitted after a predetermined amount of time from when the image or the video were obtained by the at least one camera.

15. The non-transitory computer readable program storage medium of claim 13, wherein the at least one processor is further caused to transmit, to the remote computer in response to receiving a request from the remote computer for a first location of the autonomous vehicle, the location of the autonomous vehicle.

16. The non-transitory computer readable program storage medium of claim 13, wherein the at least one processor is further caused to transmit, to the remote computer, an indication that the autonomous vehicle has reached the complete stop.

* * * * *